United States Patent
Honda

(10) Patent No.: US 7,600,061 B2
(45) Date of Patent: Oct. 6, 2009

(54) DATA TRANSFER CONTROL DEVICE AND ELECTRONIC INSTRUMENT

(75) Inventor: Hiroyasu Honda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 626 days.

(21) Appl. No.: 11/378,262

(22) Filed: Mar. 20, 2006

(65) Prior Publication Data

US 2006/0227710 A1 Oct. 12, 2006

(30) Foreign Application Priority Data

Mar. 23, 2005 (JP) .............................. 2005-083539

(51) Int. Cl.
*G06F 13/12* (2006.01)

(52) U.S. Cl. .................... 710/71; 710/305; 345/204; 375/240.28

(58) Field of Classification Search ................ 710/305, 710/62, 71; 345/204; 375/240.28; 341/146
See application file for complete search history.

(56) References Cited

U.S. PATENT DOCUMENTS

| 4,598,169 | A | 7/1986 | Komatsubara et al. | |
| 6,877,106 | B2 | 4/2005 | Tomooka et al. | |
| 7,446,774 | B1* | 11/2008 | MacInnis et al. | ............ 345/519 |
| 7,456,836 | B2 | 11/2008 | Mamiya et al. | |
| 7,475,171 | B2 | 1/2009 | Honda | |
| 2001/0002124 | A1 | 5/2001 | Mamiya et al. | |
| 2002/0011998 | A1 | 1/2002 | Tamura | |
| 2004/0165666 | A1* | 8/2004 | Kubo et al. | ............ 375/240.28 |
| 2004/0228427 | A1 | 11/2004 | Wang et al. | |
| 2005/0226338 | A1* | 10/2005 | Weston et al. | .......... 375/240.25 |
| 2006/0215703 | A1 | 9/2006 | Honda | |
| 2006/0227709 | A1 | 10/2006 | Honda | |

FOREIGN PATENT DOCUMENTS

| EP | 1 028 531 A1 | 8/2000 |
| EP | 1 164 570 A1 | 12/2001 |
| JP | A-2001-166761 | 6/2001 |
| JP | A-2001-166912 | 6/2001 |
| JP | A-2001-195048 | 7/2001 |
| JP | A-2004-145321 | 5/2004 |

* cited by examiner

*Primary Examiner*—Clifford H Knoll
(74) *Attorney, Agent, or Firm*—Oliff & Berridge, PLC

(57) ABSTRACT

A data transfer control device includes: a link controller which analyzes a packet received through a serial bus; an interface circuit which generates interface signals and outputs the interface signals to an interface bus; and a reset signal output circuit which outputs a reset signal to the interface circuit. The link controller analyzes a packet to determine whether or not the received packet includes synchronization signal generation direction information (synchronization signal code). The reset signal output circuit outputs the reset signal to the interface circuit when the link controller has determined that the received packet includes the synchronization signal generation direction information.

20 Claims, 15 Drawing Sheets

FIG.2

| SYNCHRONIZATION SIGNAL CODE (SYNCHRONIZATION SIGNAL GENERATION DIRECTION INFORMATION) | DESCRIPTION |
|---|---|
| 0 (VS=0, HS=0) | PACKET DOES NOT INCLUDE SYNCHRONIZATION SIGNAL |
| 1 (VS=1, HS=0) | PACKET INCLUDES VERTICAL SYNCHRONIZATION SIGNAL |
| 2 (VS=0, HS=1) | PACKET INCLUDES HORIZONTAL SYNCHRONIZATION SIGNAL |
| 3 (VS=1, HS=1) | PACKET INCLUDES VERTICAL SYNCHRONIZATION SIGNAL AND HORIZONTAL SYNCHRONIZATION SIGNAL | t1=VT    t2=VPW
t3=VDPS  t4=VDP t2=HT    t3=HPW
t4=HDPS  t5=HDP

FIG.10A  REQUEST PACKET

| Bit | 7 | 6 | 5 | 4 | 3 | 2 | 1 | 0 |
|---|---|---|---|---|---|---|---|---|
| | RESPONSE REQUEST | PACKET TYPE | | | LABEL | | | |
| | RETRY | ADDRESS SIZE | | | — | | | |
| | DATA LENGTH 0 | | | | | | | |
| | DATA LENGTH 1 | | | | | | | |
| | ADDRESS/COMMAND | | | | | | | |
| | CP | A+ | A+ SIZE | | | | | |
| | | | PORT NUMBER | | | | | |
| | DATA/PARAMETER | | | | | | | |
| | CRC0 | | | | | | | |
| | CRC1 | | | | | | | |

FIG.10B  STREAM PACKET

| Bit | 7 | 6 | 5 | 4 | 3 | 2 | 1 | 0 |
|---|---|---|---|---|---|---|---|---|
| | | PACKET TYPE | | | LABEL | | | |
| | — | | | | — | | | |
| | DATA LENGTH 0 | | | | | | | |
| | DATA LENGTH 1 | | | | | | | |
| | ADDRESS/COMMAND | | | | | | | |
| | SYNCHRONIZATION SIGNAL CODE | | | PORT NUMBER | | | | |
| | DATA/PARAMETER | | | | | | | |
| | CRC0 | | | | | | | |
| | CRC1 | | | | | | | |

DATA TRANSFER CONTROL DEVICE AND ELECTRONIC INSTRUMENT

Japanese Patent Application No. 2005-83539, filed on Mar. 23, 2005, is hereby incorporated by reference in its entirety.

BACKGROUND OF THE INVENTION

The present invention relates to a data transfer control device and an electronic instrument.

In recent years, a high-speed serial transfer interface such as a low voltage differential signaling (LVDS) interface has attracted attention as an interface aiming at reducing EMI noise or the like. In such a high-speed serial transfer, data is transferred by causing a transmitter circuit to transmit serialized data using differential signals and causing a receiver circuit to differentially amplify the differential signals (JP-A-2001-222249).

An ordinary portable telephone includes a first instrument section provided with buttons for inputting a telephone number or a character, a second instrument section provided with a main liquid crystal display (LCD), a sub LCD, and a camera, and a connection section (e.g. hinge) which connects the first and second instrument sections. The number of interconnects passing through the connection section can be reduced by transferring data between a first substrate of the first instrument section and a second substrate of the second instrument section by serial transfer using differential signals.

The following method may be considered as a method of realizing serial transfer through the connection section. Specifically, a host device (e.g. CPU or baseband engine) provided in the first instrument section outputs interface signals (e.g. RGB interface signals) to a host-side data transfer control device. Then, the host-side data transfer control device packetizes the interface signals and transmits the resulting packet to a target-side data transfer control device provided in the second instrument section. The target-side data transfer control device reproduces the interface signals based on the received packet, and outputs the interface signals to an LCD provided in the second instrument section.

However, when realizing serial transfer by such a method, reception of the packet is adversely affected when noise is imposed on the serial transmission line. In particular, when the host device outputs an RGB interface synchronization signal (vertical synchronization signal or horizontal synchronization signal) and the target reproduces the synchronization signal, a problem such as a change in display position occurs when noise is imposed on the serial transmission line.

SUMMARY

A first aspect of the invention relates to a data transfer control device which controls data transfer, the data transfer control device comprising:

a link controller which analyzes a packet received through a serial bus;

an interface circuit which generates interface signals including a synchronization signal and outputs the interface signals to an interface bus; and a reset signal output circuit which outputs a reset signal for the interface circuit to the interface circuit;

the link controller analyzing a packet received through the serial bus to determine whether or not the received packet includes synchronization signal generation direction information which directs the interface circuit to generate the synchronization signal; and the reset signal output circuit outputting the reset signal to the interface circuit when the link controller has determined that the received packet includes the synchronization signal generation direction information.

A second aspect of the invention relates to an electronic instrument comprising:

the above data transfer control device; and a display driver connected with the data transfer control device through the interface bus.

BRIEF DESCRIPTION OF THE SEVERAL VIEWS OF THE DRAWING

FIG. 2 is illustrative of a synchronization signal code.

FIGS. 10A and 10B are format examples of packets.

DETAILED DESCRIPTION OF THE EMBODIMENT

Figure 1:
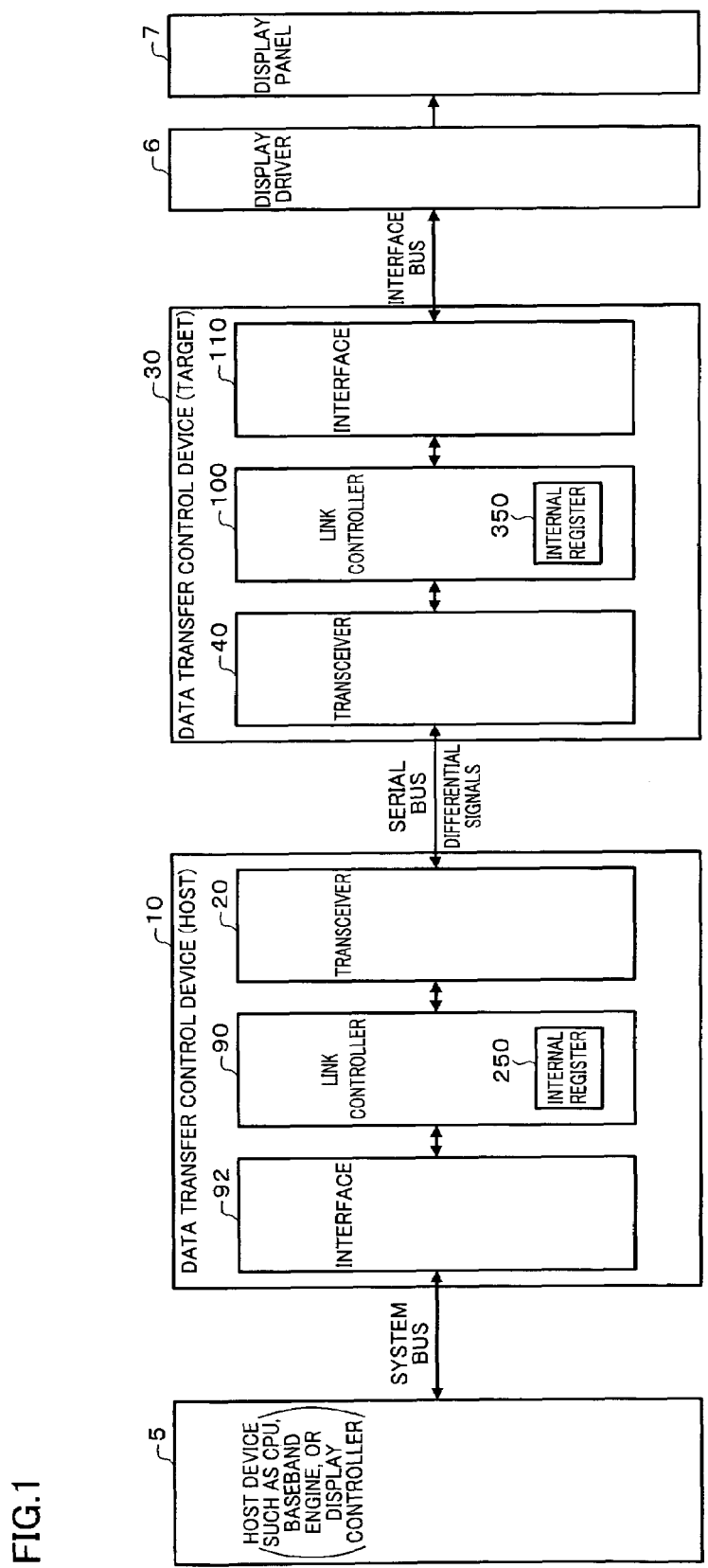
FIG. 1 shows a data transfer control device according to one embodiment of the invention and a system configuration example of the data transfer control device.

The invention may provide a data transfer control device capable of preventing occurrence of a malfunction due to noise imposed on a serial transmission line or the like, and an electronic instrument including the same.

One embodiment of the invention provides a data transfer control device which controls data transfer, the data transfer control device comprising:

a link controller which analyzes a packet received through a serial bus;

an interface circuit which generates interface signals including a synchronization signal and outputs the interface signals to an interface bus; and a reset signal output circuit which outputs a reset signal for the interface circuit to the interface circuit;

the link controller analyzing a packet received through the serial bus to determine whether or not the received packet includes synchronization signal generation direction information which directs the interface circuit to generate the synchronization signal; and the reset signal output circuit outputting the reset signal to the interface circuit when the link controller has determined that the received packet includes the synchronization signal generation direction information.

According to one embodiment of the invention, when the link controller has determined that the packet received through the serial bus includes the synchronization signal generation direction information, the reset signal is output to the interface circuit, so that a part or the entirety of the interface circuit is reset (initialized). Therefore, even if a malfunction has occurred due to noise imposed on the serial transmission line, a problem in which the malfunction continuously occurs can be prevented.

With this embodiment, a packet received through the serial bus may include a synchronization signal code field for setting a synchronization signal code which is the synchronization signal generation direction information;

the link controller may analyze the synchronization signal code field of a packet received through the serial bus to determine whether or not the synchronization signal code which directs the interface circuit to generate the synchronization signal is set in the synchronization signal code field; and the reset signal output circuit may output the reset signal to the interface circuit when the link controller has determined that the synchronization signal code which directs the interface circuit to generate the synchronization signal is set in the synchronization signal code field of the received packet.

The synchronization signal included in the interface signals can be generated based on the synchronization signal code using a packet in which the synchronization signal is set in the synchronization signal code field. Therefore, the synchronization signal can be reproduced by simple processing.

With this embodiment, the link controller may receive a display period packet, in which data is set in a data field, through the serial bus in a display period, and may receive a non-display period packet, in which data is not set in the data field, through the serial bus in a non-display period.

This allows a packet containing a small amount of data, in which data is not set in the data field, to be transferred through the serial bus in the non-display period, whereby the data transfer efficiency can be increased.

With this embodiment, when the link controller has received the display period packet in which data is set in the data field, the link controller may output the header including the synchronization signal code set in the packet and the data set in the packet to the interface circuit, and, when the link controller has received the non-display period packet in which data is not set in the data field, the link controller may output the header including the synchronization signal code set in the packet to the interface circuit.

This enables the efficiency of data transfer between the link controller and the interface circuit to also be increased.

This embodiment may include an internal register in which timing information for specifying a change timing of a signal level of the interface signal output from the interface circuit is set, and the interface circuit may generate the interface signal of which the signal level changes at a timing according to the timing information based on the timing information set in the internal register.

This enables generation of an interface signal of which the signal level changes at an appropriate timing based on the timing information without successively receiving detailed information about the interface signal through the serial bus. Therefore, the interface signal can be efficiently generated.

With this embodiment, the timing information may be set in the internal register based on a packet received through the serial bus.

This enables the timing information specifying a change in the signal level of the interface signal in detail to be efficiently received through the serial bus.

With this embodiment, the link controller may receive a packet in which data is set in the data field through the serial bus after the timing information has been set in the internal register; and the interface circuit may output the interface signals including a signal of the data set in the packet and the synchronization signal at a timing according to the timing information set in the internal register.

According to this feature, the timing information is transferred before transferring data, and a packet in which data is set in the data field is transferred thereafter. Therefore, the amount of data can be reduced when transferring a packet in which data is set in the data field, whereby the efficiency of data transfer through the serial bus can be increased.

This embodiment may includes a packet buffer into which a packet received through the serial bus is written and which outputs an N-bit signal and a 1-bit signal, the packet buffer may output a reset direction signal as the 1-bit signal when the link controller has determined that the received packet includes the synchronization signal generation direction information, and the reset signal output circuit may output the reset signal to the interface circuit when the reset direction signal has been output from the packet buffer.

This prevents a problem in which a malfunction which has occurred due to noise imposed on the serial transmission line continuously occurs while minimizing an increase in the circuit scale and complication of processing.

With this embodiment, the interface circuit may include a counter for generating the synchronization signal; and the counter may be reset by the reset signal.

With this embodiment, the interface circuit may output an RGB interface signal.

This embodiment may include a transceiver which transmits and receives a packet to and from a host-side data transfer control device using differential signal lines of the serial bus.

Another embodiment of the invention provides an electronic instrument comprising:

the above data transfer control device; and a display driver connected with the data transfer control device through the interface bus.

Note that the embodiments described hereunder do not in any way limit the scope of the invention defined by the claims laid out herein. Note also that not all of the elements of these embodiments should be taken as essential requirements to the means of the present invention.

1. System Configuration

FIG. 1 shows a data transfer control device (data transfer control circuit) according to one embodiment of the invention and a system configuration example of the data transfer control device. In one embodiment of the invention, a bridge function between a system bus and an interface bus is realized by using host-side and target-side data transfer control devices 10 and 30 as shown in FIG. 1.

The configuration of the data transfer control devices 10 and 30 is not limited to the configuration shown in FIG. 1. Some of the circuit blocks shown in FIG. 1 may be omitted, or the configuration of the connection between the circuit blocks may be changed, or a circuit block differing from the circuit blocks shown in FIG. 1 may be additionally provided. For example, a transceiver 20 may be omitted from the host-side data transfer control device 10, or a transceiver 40 may be omitted from the target-side data transfer control device 30.

The data transfer control device 30 and a display driver 6 may be formed by two chips (semiconductor chips), or may be formed by one chip. For example, when using the data transfer control device 30 as an intellectual property (IP) core, the data transfer control device 30 may be included in the semiconductor chip of the display driver 6. Likewise, a host device 5 (system device) and the data transfer control device 10 may be formed by one chip.

The host (TX) side data transfer control device 10 and the target (RX) side data transfer control device 30 transfer packets through a serial bus using differential signals. In more detail, the data transfer control devices 10 and 30 transmit and receive packets by current-driving or voltage-driving differential signal lines of the serial bus.

The host-side data transfer control device 10 includes an interface circuit 92 which performs interface processing between the data transfer control device 10 and the host device 5 (e.g. CPU, baseband engine, or display controller). The interface circuit 92 is connected with the host device 5 through a system bus (host bus). The system bus may be used as an RGB interface bus or a micro processor unit (MPU) interface bus. When using the system bus as an RGB interface bus, the system bus may include signal lines for a horizontal synchronization signal, vertical synchronization signal, clock signal, data signal, and the like. When using the system bus as an MPU interface bus, the system bus may include signal lines for a data signal, read signal, write signal, address 0 signal (command/parameter identification signal), chip select signal, and the like.

The host-side data transfer control device 10 includes a link controller 90 (link layer circuit) which performs link layer processing. The link controller 90 generates a packet (e.g. request packet or stream packet) transferred to the target-side data transfer control device 30 through the serial bus (LVDS), and transmits the generated packet. In more detail, the link controller 90 initiates a transmission transaction and directs the transceiver 20 to transmit the generated packet.

The host-side data transfer control device 10 includes the transceiver 20 (PHY) which performs physical layer processing or the like. The transceiver 20 transmits a packet indicated by the link controller 90 to the target-side data transfer control device 30 through the serial bus. The transceiver 20 also receives a packet from the target-side data transfer control device 30. In this case, the link controller 90 analyzes the received packet and performs link layer (transaction layer) processing.

The target-side data transfer control device 30 includes the transceiver 40 (PHY) which performs physical layer processing or the like. The transceiver 40 receives a packet from the host-side data transfer control device 10 through the serial bus. The transceiver 40 also transmits a packet to the host-side data transfer control device 10. In this case, a link controller 100 generates a packet transmitted to the host-side data transfer control device 10, and directs the transceiver 40 to transmit the generated packet.

The target-side data transfer control device 30 includes the link controller 100 (link layer circuit). The link controller 100 performs link layer (transaction layer) processing including receiving a packet from the host-side data transfer control device 10 and analyzing the received packet.

The target-side data transfer control device 30 includes an interface circuit 110 which performs interface processing between the data transfer control device 30 and the display driver 6 (display driver circuit) which drives a display panel 7 (e.g. LCD). The interface circuit 110 generates various interface signals and outputs the generated interface signals to the interface bus. The interface circuit 110 may include an RGB interface circuit, an MPU interface circuit, and a serial interface circuit (first to Nth interface circuits in a broad sense). The interface circuit 110 may perform interface processing between the data transfer control device 30 and a camera device or a sub LCD.

The following description provides the configuration and the operation 10 according to one embodiment of the invention when the host-side data transfer control device 10 transmits a request packet to the target-side data transfer control device 30 for convenience of description. The same description also applies to the configuration and the operation when the target-side data transfer control device 30 transmits a request packet to the host-side data transfer control device 10.

2. Generation of Synchronization Signal Based on Synchronization Signal Code (Synchronization Signal Generation Direction Information)

In one embodiment of the invention, synchronization signal generation direction information is included in a packet transmitted from the host to the target through the serial bus using differential signals (may be single-end transfer). The synchronization signal generation direction information is information which directs the target-side interface circuit 110 to generate the synchronization signal. In more detail, a packet received by the target through the serial bus includes a synchronization signal code field. The target-side interface circuit 110 generates the synchronization signal based on a synchronization signal code (synchronization signal generation direction information in a broad sense) set in the synchronization signal code field, and outputs the generated synchronization signal to the interface bus.

FIG. 2 shows an example of the synchronization signal code. A synchronization signal code set at "0" (VS=0, HS=0) means that the packet does not include the synchronization signal. Specifically, since the synchronization signal (vertical synchronization signal or horizontal synchronization signal) has not been detected by the host, it is unnecessary for the target to output the synchronization signal. A synchronization signal code set at "1" (VS=1, HS=0) means that the packet includes the vertical synchronization signal. Specifically, since the vertical synchronization signal has been detected by the host, it is necessary for the target to output the vertical synchronization signal. A synchronization signal code set at "2" (VS=0, HS=1) means that the packet includes the horizontal synchronization signal. Specifically, since the horizontal synchronization signal has been detected by the host, it is necessary for the target to output the horizontal synchronization signal. A synchronization signal code set at "3" (VS=1, HS=1) means that the packet includes the vertical synchronization signal and the horizontal synchronization signal.

Figure 3:
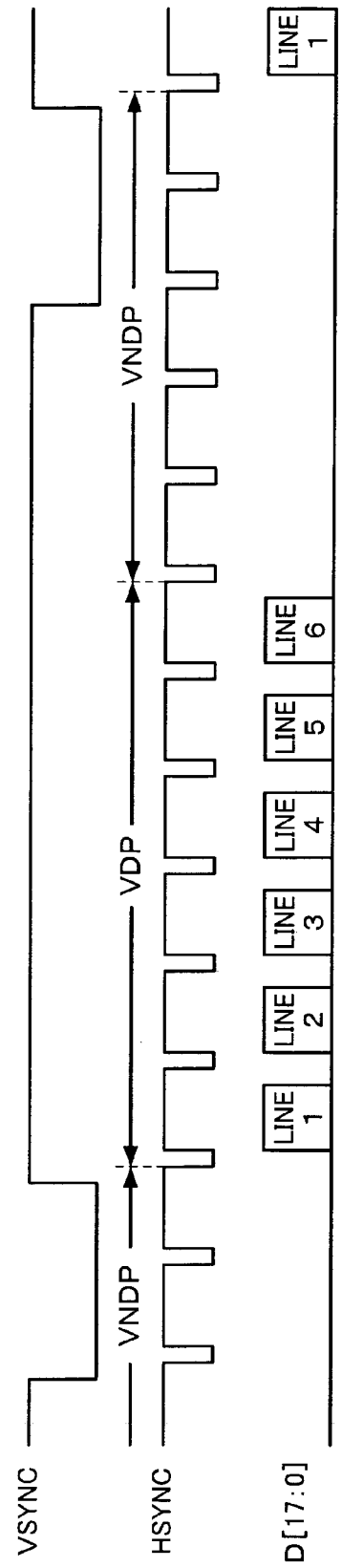
FIG. 3 is illustrative of RGB interface signals output from a host device.

FIG. 3 shows an example of the interface signals output from the host device 5. In FIG. 3, VSYNC indicates the vertical synchronization signal, and HSYNC indicates the vertical synchronization signal. D[17:0] indicates a data signal (RGB data signal or pixel data signal).

Figure 4A:
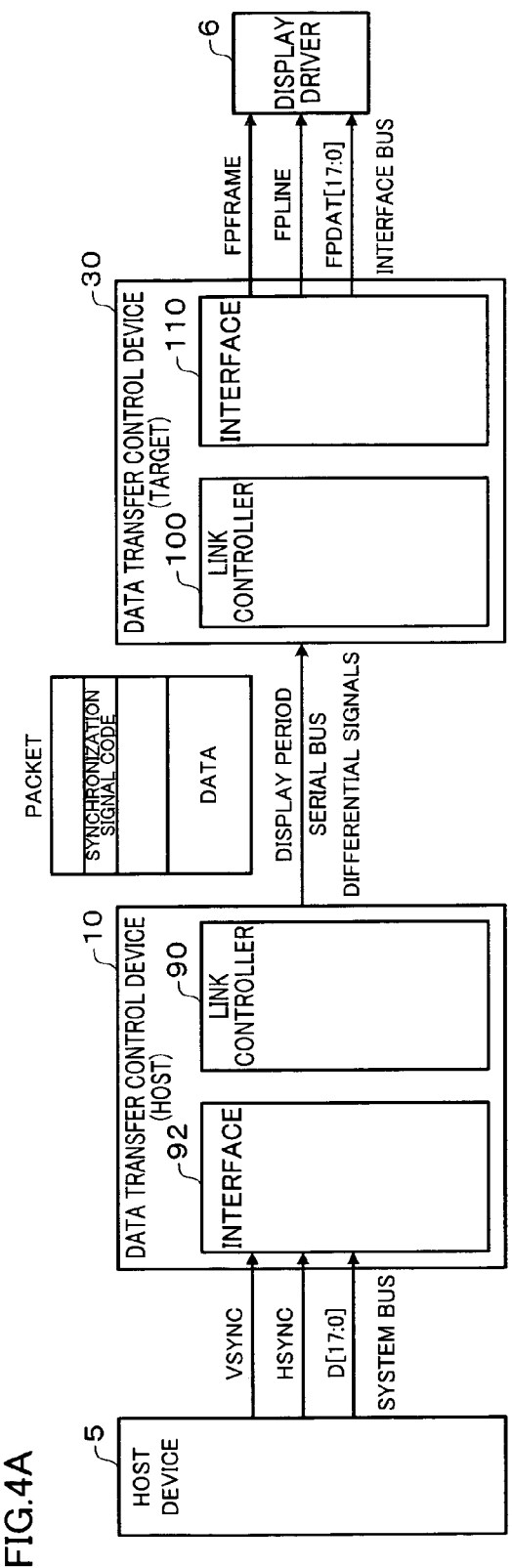
FIGS. 4A and 4B are illustrative of a method of incorporating a synchronization signal code into a packet.

As shown in FIG. 4A, the host-side interface circuit 92 receives the synchronization signals VSYNC and HSYNC and the data signal D[17:0] shown in FIG. 3 from the host device 5.

The host-side interface circuit 92 which has received the synchronization signals VSYNC and HSYNC from the host device 5 detects the synchronization signals VSYNC and HSYNC. The host-side link controller 90 sets the synchronization signal code corresponding to the synchronization signals VSYNC and HSYNC received from the host device 5 in the synchronization signal code field of a packet (header), as shown in FIG. 4A, based on the detection result. For example, when the synchronization signal VSYNC has been detected, the link controller 90 sets the synchronization signal code (VS=1, HS=0) indicating detection of the synchronization signal VSYNC in a packet. When the synchronization signal HSYNC has been detected, the link controller 90 sets the synchronization signal code (VS=0, HS=1) indicating detection of the synchronization signal HSYNC in a packet. When the synchronization signals VSYNC and HSYNC have been detected, the link controller 90 sets the synchronization signal code (VS=1, HS=1) indicating detection of the synchronization signals VSYNC and HSYNC in a packet. In a display period in which the data signal D[17:0] is transferred, data corresponding to the data signal D[17:0] is set in a data field of a packet. The host-side data transfer control device 10 transmits the packet thus generated to the target-side data transfer control device 30 through the serial bus using differential signals.

The target-side link controller 100 analyzes the packet received from the host, and detects the synchronization signal code set in the packet. When the synchronization signal code set in the packet has been detected, the target-side interface circuit 110 generates synchronization signals FPFRAME and FPLINE based on the detected synchronization signal code, and outputs the synchronization signals FPFRAME and FPLINE to the interface bus. The synchronization signals FPFRAME and FPLINE respectively correspond to the vertical synchronization signal and the horizontal synchronization signal. The interface circuit 110 outputs a data signal FPDAT[17:0] corresponding to the data set in the data field of the packet to the interface bus.

Figure 5:
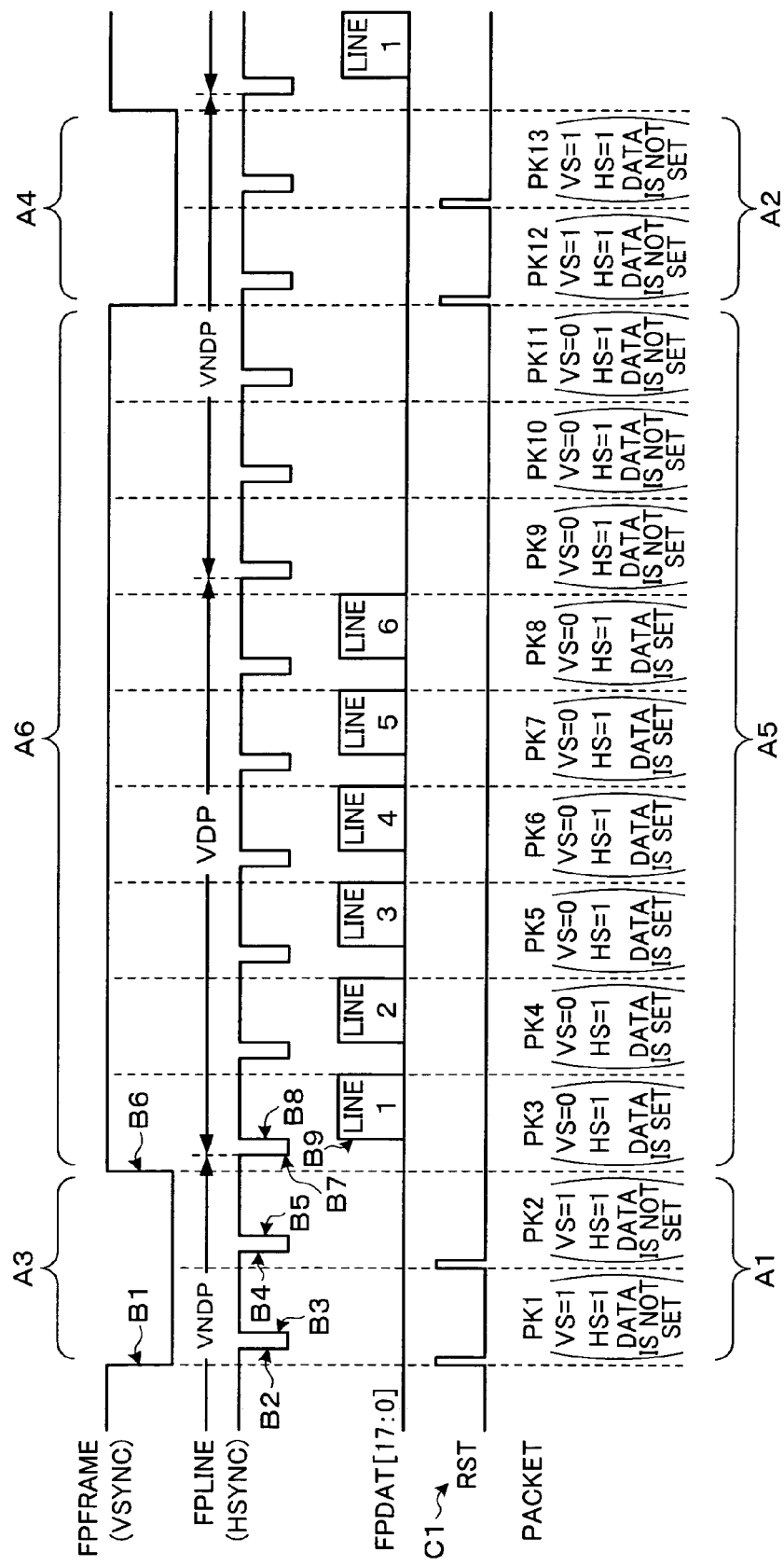
FIG. 5 is illustrative of a method of allowing a target to generate a synchronization signal using a synchronization signal code.

In more detail, the synchronization signal code set at "VS=1, HS=1" is included in received packets PK1, PK2, PK12, and PK13, as indicated by A1 and A2 in FIG. 5. Therefore, the signals FPFRAME and FPLINE set at active are output, as indicated by A3 and A4 in FIG. 5. The synchronization signal code set at "VS=0, HS=1" is included in packets PK3 to PK11 received in a period A5. Therefore, only the signal FPLINE is set to active and output each time the packet is received, as indicated by A6.

Figure 4B:
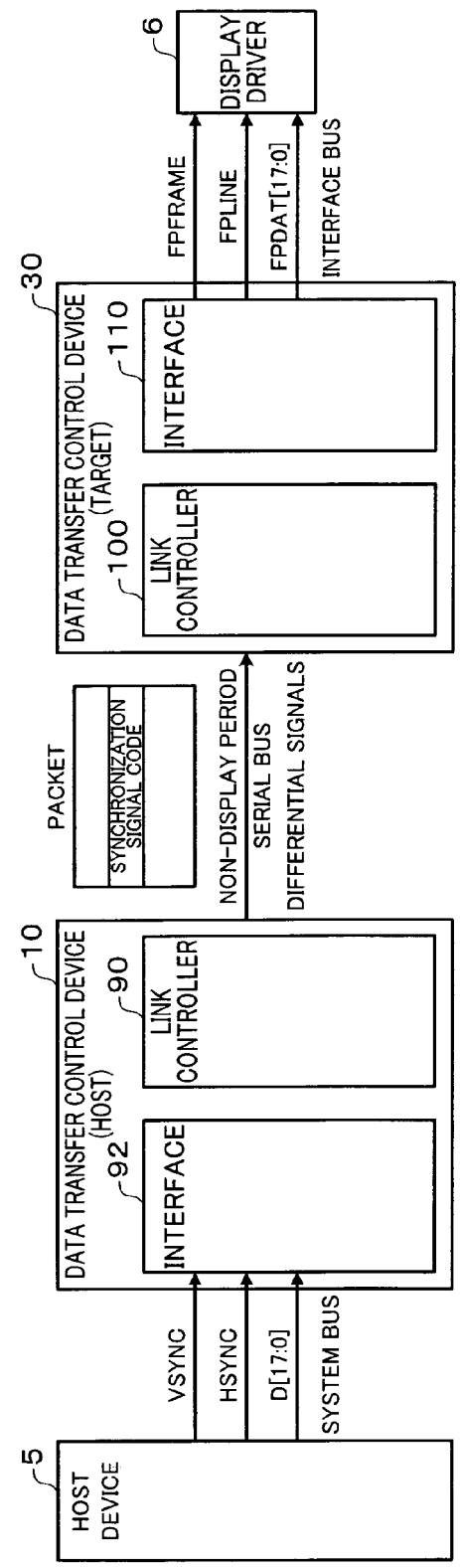

In one embodiment of the invention, as shown in FIG. 4A, the host-side link controller 90 generates a display period packet, in which the synchronization signal code is set in the synchronization signal code field and data is set in the data field, in the display period. As shown in FIG. 4B, the host-side link controller 90 generates a non-display period packet, in which the synchronization signal code is set in the synchronization signal code field and data is not set in the data field, in the non-display period.

The target receives the display period packet, in which data is set in the data field, from the host-side data transfer control device 10 in the display period shown in FIG. 4A. The link controller 100 which has received the display period packet outputs the header including the synchronization signal code set in the packet and the data set in the packet to the interface circuit 110.

The target receives the non-display period packet, in which data is not set in the data field, from the host-side data transfer control device 10 in the non-display period shown in FIG. 4B. The link controller 100 which has received the non-display period packet outputs the header including the synchronization signal code set in the packet to the interface circuit 110.

This allows a packet in which data is not set in the data field to be transferred from the host to the target through the serial bus in the non-display period. Since the number of bits (number of bytes) of a packet in which data is not set in the data field is small, the data transfer efficiency through the serial bus can be increased in the non-display period. Therefore, a decrease in the data transfer efficiency can be minimized even when transferring a packet including the synchronization signal code in the non-display period.

3. Generation of Interface Signal Based on Timing Information

In one embodiment of the invention, the target (RX) side interface circuit 110 automatically generates the interface signals (interface control signal and data signal) based on timing information set in advance.

In more detail, an internal register 350 of the target-side data transfer control device 30 stores interface information for specifying the signal form (output format) of the interface signal output from the interface circuit 110. Specifically, the internal register 350 stores timing information for specifying the change timing of the signal level of the interface signal. In this case, information stored in an internal register 250 of the host-side data transfer control device 10 and necessary for the target is transferred to the target through the serial bus and is written into the target-side internal register 350. Specifically, the target-side internal register 350 is a subset (shadow register) of the host-side internal register 250. Based on the timing information set in the target-side internal register 350, the interface circuit 110 generates and outputs an interface signal (interface control signal or data signal) of which the signal level changes at a timing according to the timing information.

Specifically, the host device 5 sets interface signal timing information in the host-side internal register 250 as an initial setting before transferring data. The host device 5 directs start of register transfer using a register transfer start register included in the host-side internal register 250. Then, the interface signal timing information written into the host-side internal register 250 is packet-transferred from the host-side data transfer control device 10 to the target-side data transfer control device 30 through the serial bus. The transferred timing information is written into the target-side internal register 350.

After the above-described initial setting, the host device 5 writes data (command or parameter) into a port write register of the host-side internal register 250. Then, a packet in which data is set in the data field is transmitted from the host-side data transfer control device 10 to the target-side data transfer control device 30 through the serial bus. The interface circuit 110 outputs interface signals including a signal of the data set in the packet to the interface bus at a timing according to the timing information set in the target-side internal register 350.

The following method may be considered as a comparative example. Specifically, the host-side data transfer control device 10 samples the interface signals VSYNC, HSYNC, and D[17:0] from the host device 5 in synchronization with a sampling clock signal at a high frequency (e.g. frequency twice the frequency of a pixel clock signal), and transmits sampling result information to the target-side data transfer control device 30 through the serial bus. The target-side data transfer control device 30 reproduces the sampling result information and outputs interface signals similar to the interface signals VSYNC, HSYNC, and D[17:0] to the display driver 6.

However, since the method of the comparative example requires the frequency of the sampling clock signal to be increased in the host-side data transfer control device 10, power consumption is increased. Moreover, the amount of data (traffic volume) transferred through the serial bus is increased.

In one embodiment of the invention, the timing information is transferred before transferring data, and the interface circuit 110 automatically generates the interface signals based on the timing information. This makes it unnecessary to sample the interface signals VSYNC, HSYNC, and D[17:0] from the host device 5 in synchronization with the high-frequency sampling clock signal, whereby power consumption can be reduced. Moreover, an interface signal of which the signal level changes at an appropriate timing can be generated without successively transferring detailed information about the interface signal from the host to the target. Therefore, the amount of data transferred through the serial bus can be reduced, whereby an efficient data transfer can be realized.

Figure 6A:
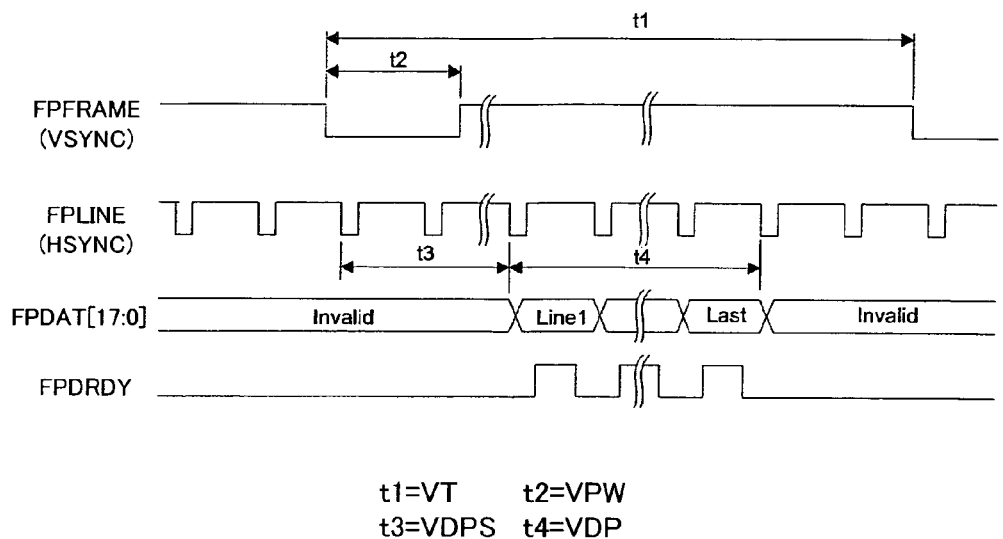
FIGS. 6A and 6B are signal waveform examples of RGB interface signals.
Figure 6B:
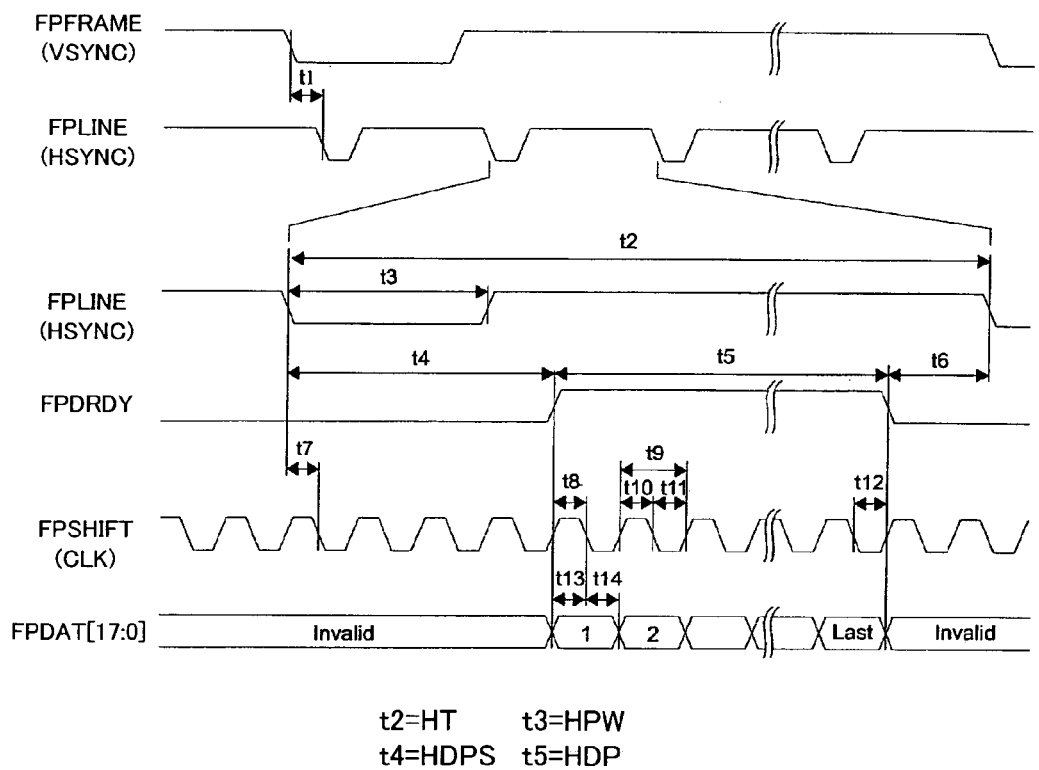

FIGS. 6A and 6B show signal waveform examples of RGB interface signals generated by the interface circuit 110 (RGB interface circuit). In FIGS. 6A and 6B, FPFRAME indicates a vertical synchronization signal, FPLINE indicates a horizontal synchronization signal, FPDAT[17:0] indicates an RGB data signal, FPDRDY indicates a data ready signal, and FPSHIFT indicates a clock signal (pixel clock signal).

As shown in FIG. 6A, when the signal FPFRAME has become active and the signal FPLINE has become active a given number of times, the non-display period (front porch) transitions to the display period, so that the data signal FPDAT[17:0] of the first line (first scan line) is output. When the data signals of all the lines have been output, the display period transitions to the non-display period (back porch).

FIG. 6B is an enlarged signal waveform diagram showing the state in which the data signal of one line is transferred. Each bit of the data signal FPDATA[17:0] of one line is output in synchronization with the rising edge of the clock signal FPSHIFT after the signal FPDRDY has become active, for example.

In one embodiment of the invention, "t1=VT", "t2=VPW", "t3=VDPS", and "t4=VDP" shown in FIG. 6A are set in the target-side internal register 350 as the timing information. "t2=HT", "t3=HPW", "t4=HDPS", and "t5=HDP" shown in FIG. 6B are also set in the internal register 350 as the timing information.

Figure 7:
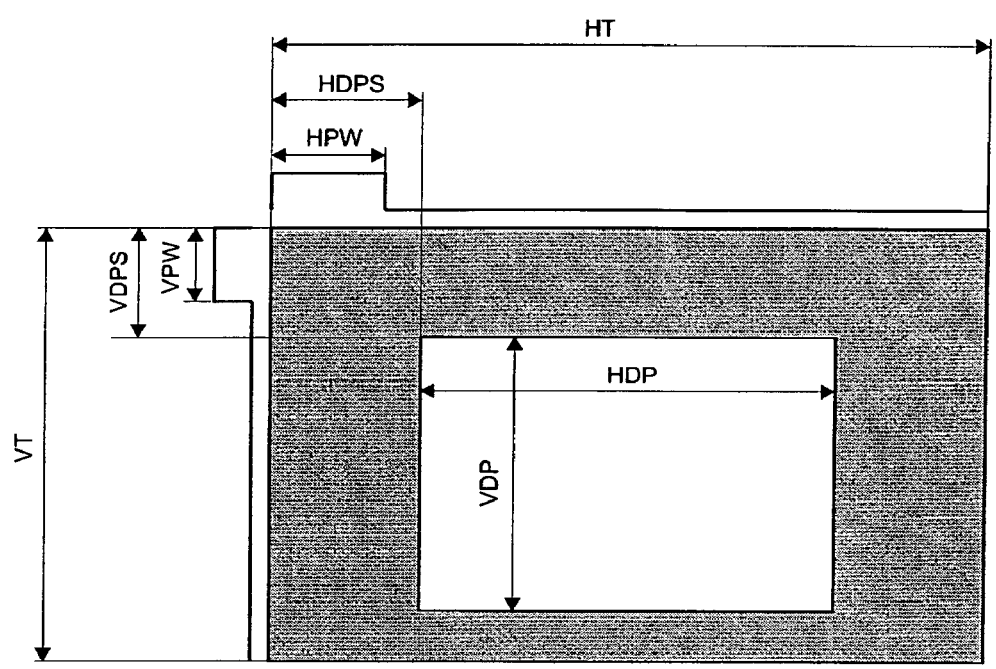
FIG. 7 is illustrative of timing information.

As shown in FIG. 7, HT (Horizontal Total) is the length of a horizontal synchronization period. HDP (Horizontal Display Period) is the length of the display period in the horizontal synchronization period. HDPS (Horizontal Display Period Start position) is the start position of the display period in the horizontal synchronization period. HPW (Horizontal Pulse Width) is the pulse width of the horizontal synchronization signal. VT (Vertical Total) is the length of a vertical synchronization period. VDP (Vertical Display Period) is the length of the display period in the vertical synchronization period. VDPS (Vertical Display Period Start position) is the start position of the display period in the vertical synchronization period. VPW (Vertical Pulse Width) is the pulse width of the vertical synchronization signal.

In one embodiment of the invention, the timing information (HT, HDP, HDPS, HPW, VT, VDP, VDPS, and VPW) is written into the host-side internal register 250 from the host device 5 during the initial setting. The timing information is then transmitted to the target through the serial bus, and written into the target-side internal register 350. The RGB interface signals shown in FIGS. 6A and 6B can be easily and automatically generated by using the timing information. All of the timing information HT, HDP, HDPS, HPW, VT, VDP, VDPS, and VPW need not necessarily be stored in the internal register 350 as the timing information which can be set at an arbitrary value. Some of the timing information may be set at a fixed value. For example, the timing information HPW and VPW may be set at fixed values, and may not be stored in the internal register 350 as the timing information.

For example, when the target-side data transfer control device 30 has received the packet PK1 in which "VS=1, HS=1" in FIG. 5, the target-side data transfer control device 30 sets the signal FPFRAME to active (low level), as indicated by a timing B1. When a predetermined period (t1 in FIG. 6B) has elapsed, the target-side data transfer control device 30 sets the signal FPLINE to active (low level), as indicated by a timing B2. Then, when a period corresponding to the timing information HPW (t3 in FIG. 6B) has elapsed, the target-side data transfer control device 30 sets the signal FPLINE to inactive (high level), as indicated by a timing B3.

When the target-side data transfer control device 30 has received the packet PK2 in which "VS=1, HS=1" and a period corresponding to the timing information HT (t2 in FIG. 6B) has elapsed, the target-side data transfer control device 30 sets the signal FPLINE to active, as indicated by a timing B4. When a period corresponding to the timing information HPW has elapsed, the target-side data transfer control device 30 sets the signal FPLINE to inactive, as indicated by a timing B5.

When the target-side data transfer control device 30 has received the packet PK3 in which "VS=0, HS=1" and a period corresponding to the timing information VPW (t2 in FIG. 6A) has elapsed from the timing B1, the target-side data transfer control device 30 sets the signal FPFRAME to inactive (high level), as indicated by a timing B6. When a period corresponding to the timing information VDPS (t3 in FIG. 6A) has elapsed from the timing B2, the target-side data transfer control device 30 sets the signal FPLINE to active, as indicated by a timing B7. When a period corresponding to the timing information HPW has elapsed from the timing B7, the target-side data transfer control device 30 sets the signal FPLINE to inactive, as indicated by a timing B8. When a period corresponding to the timing information HDPS (t4 in FIG. 6B) has elapsed from the timing B7, the target-side data transfer control device 30 starts outputting the data signal FPDAT of the first line, as indicated by a timing B9.

As described above, according to one embodiment of the invention, the precise change timings of the signal levels of the signals FPFRAME, FPLINE, and FPDAT are adjusted based on the timing information (HT, HDP, HDPS, HPW, VT, VDP, VDPS, and VPW) set in the internal register 350. Specifically, the target-side data transfer control device 30 receives only the information (synchronization signal code) indicating the synchronization signal which has changed from the host-side data transfer control device 10, and finely adjusts the actual change timing of the synchronization signal or the data signal based on the timing information transmitted before transferring data. This makes it unnecessary for the host to sample the interface signals from the host device 5 in synchronization with the high-frequency clock signal, whereby power consumption can be reduced. Moreover, since the amount of data transferred from the host to the target through the serial bus can be reduced, the data transfer efficiency can be increased.

4. Configuration Example of Data Transfer Control Device

The above-described method enables an efficient serial transfer to be realized in a portable telephone or the like between a first instrument section provided with buttons for inputting a telephone number and a second instrument section provided with an LCD (display driver).

Figure 8A:
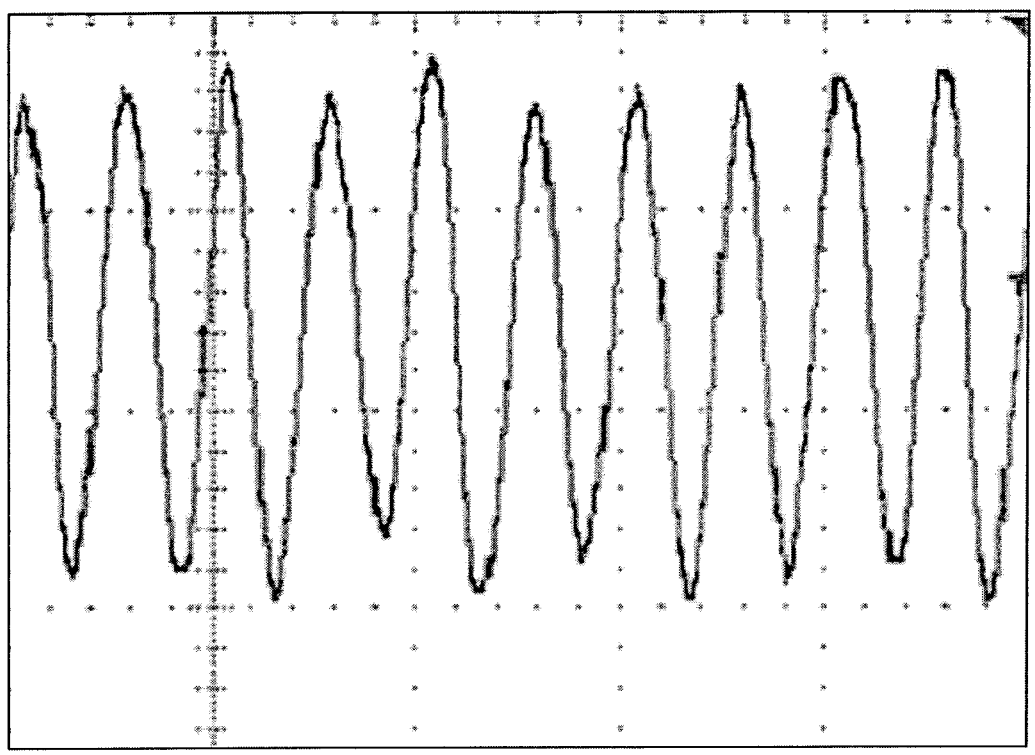
FIGS. 8A and 8B are illustrative of noise imposed on a serial transmission line.

However, it was found that a problem occurs when noise is imposed on the serial transmission line of the serial bus. The noise occurs when bringing another portable terminal close to the portable telephone. FIG. 8A shows a signal waveform example of the serial transmission line when another portable terminal is not close to the portable telephone, and FIG. 8B shows a signal waveform example of the serial transmission line when another portable terminal is brought close to the portable telephone.

Figure 8B:
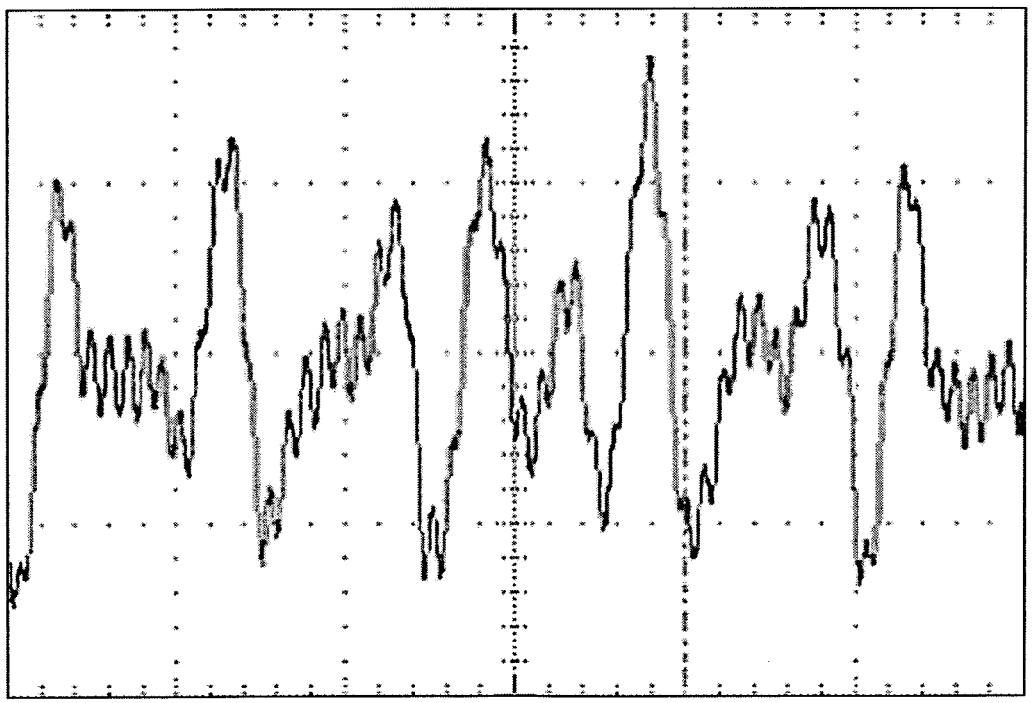

When noise is imposed on the serial transmission line as shown in FIG. 8B, an internal circuit (e.g. receiver circuit) of the data transfer control device malfunctions so that a packet cannot be correctly received. In particular, malfunction due to noise causes a serious problem when using the method in which the target generates the synchronization signal based on the synchronization signal code included in a packet transferred through the serial bus, as shown in FIGS. 4A and 4B. Specifically, the receiver circuit or the like of the data transfer control device 30 malfunctions due to the noise shown in FIG. 8B, so that a counter included in the interface circuit 110 which generates the synchronization signal malfunctions or hangs. This causes a change in display position or the like to occur, whereby the display state of the display panel is adversely affected. In some cases, the display panel cannot display an image.

In order to solve such a problem, one embodiment of the invention employs a method of resetting (initializing) the interface circuit 110 (RGB interface circuit) in a specific cycle. In more detail, the interface circuit 110 is reset each time the synchronization signal code (synchronization signal generation direction information in a broad sense) is received.

Figure 9:
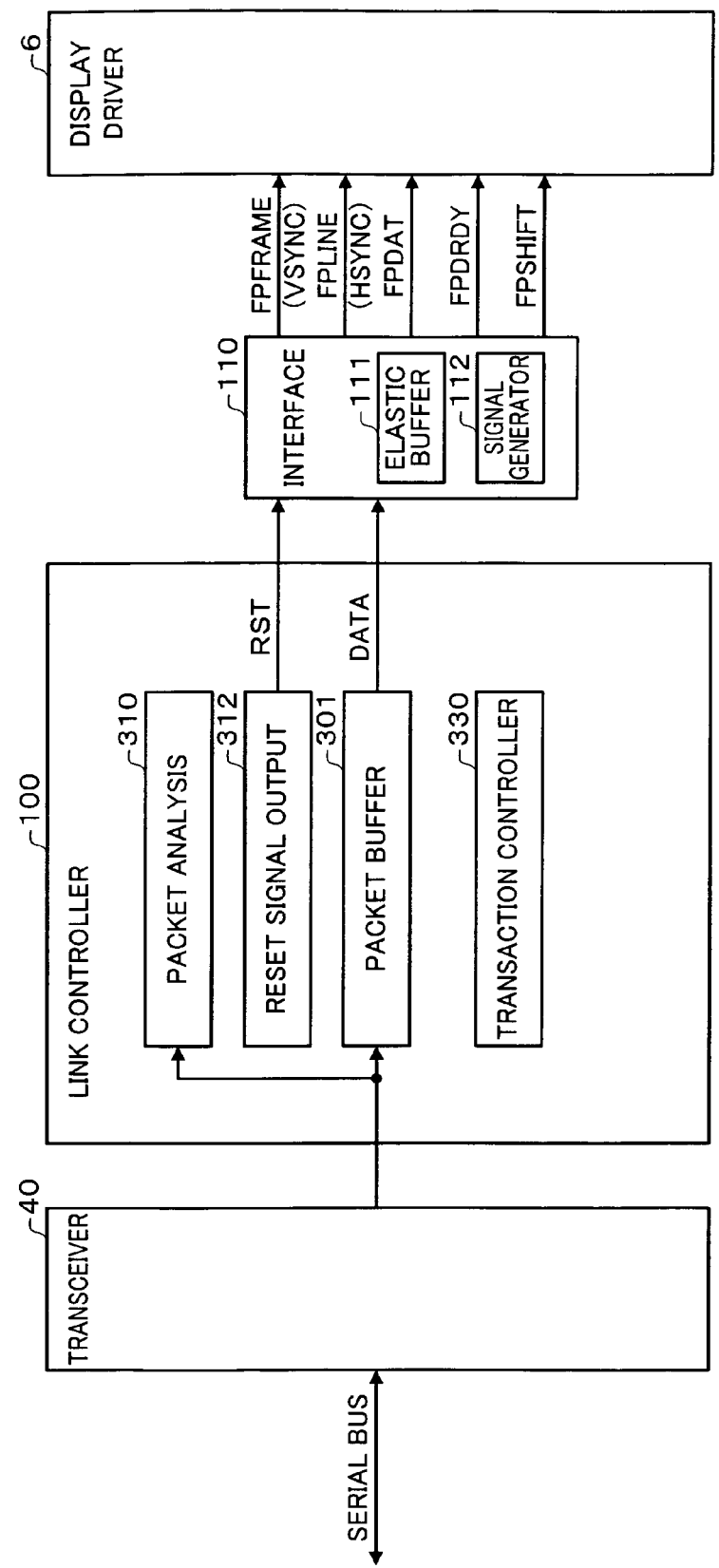
FIG. 9 is a configuration example of a data transfer control device according to one embodiment of the invention.

FIG. 9 shows a configuration example of the data transfer control device which realizes the method according to one embodiment of the invention. Note that some of the circuit blocks shown in FIG. 9 may be omitted, or the configuration of the connection between the circuit blocks may be changed, or a circuit block differing from the circuit blocks shown in FIG. 9 may be additionally provided. A packet buffer 301, a reset signal output circuit 312, and the like may be provided either inside or outside the link controller 100.

In FIG. 9, the transceiver 40 including a physical layer analog circuit receives a packet (data) transmitted from the host-side data transfer control device 10 through the differential signal lines of the serial bus. The transceiver 40 also transmits a packet to the host-side data transfer control device 10 through the differential signal lines of the serial bus.

FIGS. 10A and 10B show format examples of packets transferred through the serial bus. The field configuration and the field arrangement of each packet are not limited to those of the examples shown in FIGS. 10A and 10B. Various modifications and variations may be made.

A request packet (write request packet or read request packet) shown in FIG. 10A is a packet for requesting writing or reading of data (parameter) or the like. The request packet includes a response request field, a packet type field, a label field, a retry field, an address size field, a data length field, an address/command field, a CP (packet fragmentation) field, an A+ (address automatic update) field, an A+ size (number of updates) field, a port number field, a data/parameter field, and a cyclic redundancy check (CRC) field. Note that the read request packet does not include the data field.

A stream packet shown in FIG. 10B is a packet for performing stream transfer of data (parameter). The stream transfer is data transfer which realizes a high-speed and continuous transfer while maintaining isochronicity between the transmitter side and the receiver side. The stream packet includes a packet type field, a label field, a data length field, an address/command field, a synchronization signal code field, a port number field, a data/parameter field, and a CRC field. The details of the synchronization signal code are shown in FIG. 2.

The packet buffer 301 (RGB elastic buffer) is a reception packet buffer into which a packet received through the serial bus is written. Specifically, a packet received through the serial bus is input to the link controller 100 though the transceiver 40, and written into the packet buffer 301. The packet buffer 301 may be formed by a RAM or a first-in first-out (FIFO) memory, for example. The packet buffer 301 may have a ring buffer structure or a double buffer configuration.

A packet analysis circuit 310 analyzes a packet received through the serial bus. Specifically, the packet analysis circuit 310 separates the received packet into a header and data and extracts the header. The packet analysis circuit 310 analyzes the response request field to determine whether or not a response is requested, and analyzes the packet type field to determine the type (e.g. write request packet, read request packet, or stream packet) of the received packet. The packet analysis circuit 310 analyzes the address size field to determine the size of the address set in the address/command field. The packet analysis circuit 310 analyzes the synchronization signal code field to determine whether or not the received packet includes the synchronization signal code (synchronization signal generation direction information) which directs the interface circuit 110 to generate the synchronization signal (vertical synchronization signal). Specifically, the packet analysis circuit 310 determines whether the value of the synchronization signal code shown in FIG. 2 is "0", "1", "2", or "3". When the value of the synchronization signal code is "0", the packet analysis circuit 310 determines that the packet does not include the synchronization signal code which directs generation of the synchronization signal. When the value of the synchronization signal code is "1", "2", or "3" (or, "1" or "3"), the packet analysis circuit 310 determines that the packet includes the synchronization signal code which directs generation of the synchronization signal (vertical synchronization signal), for example.

The reset signal output circuit 312 (reset signal output buffer or reset signal output means) is a circuit which outputs a reset signal RST for the interface circuit 110 to the interface circuit 110. The reset signal output circuit 312 may be formed by a buffer circuit for outputting a reset signal, for example. Or, the reset signal output circuit 312 may include a pulse generation circuit for generating a pulse signal of the reset signal, for example.

In one embodiment of the invention, when the packet analysis circuit 310 has determined that the received packet includes the synchronization signal generation direction information, the reset signal output circuit 312 outputs the reset signal RST to the interface circuit 110. In more detail, when the packet analysis circuit 310 has determined that the synchronization signal code which directs generation of the synchronization signal is set in the synchronization signal code field of the received packet, the reset signal output circuit 312 outputs the reset signal RST as indicated by C1 in FIG. 5 to the interface circuit 110. When the reset signal RST has been input to the interface circuit 110, the interface circuit 110 is reset (initialized). In more detail, a counter (pixel counter or horizontal counter) or the like included in the interface circuit 110 is reset.

Whether or not the received packet includes the synchronization signal generation direction information (synchronization signal code) may be determined by the packet analysis processing of the packet analysis circuit 310, for example.

The synchronization signal generation information which directs the interface circuit 110 to generate the synchronization signal is not limited to the synchronization signal code as shown in FIG. 2. For example, whether or not generation of the synchronization signal is directed may be determined by utilizing information set in the field of the header of the packet other than the synchronization signal code field as the synchronization signal generation information. Or, whether or not generation of the synchronization signal is directed may be determined based on the data/parameter (reset code) set in the data/parameter field of the packet.

It is preferable to output the reset signal RST when a packet including the vertical synchronization signal code (vertical synchronization signal generation direction information) (VS=1) has been received, as indicated by C1 in FIG. 5. The reset signal RST may also be output when a packet including the horizontal synchronization signal code (horizontal synchronization signal generation direction information)(VH=1) has been received.

The reset signal RST may be a 1-bit signal, or may be a signal made up of two or more bits. For example, the reset signal output circuit 312 may output a first reset signal which is set to active when receiving a packet including the vertical synchronization signal code and a second reset signal which is set to active when receiving a packet including the horizontal synchronization signal code. Or, the reset signal RST may be an N-bit (e.g. 8-bit) reset code. In this case, the interface circuit 110 decodes the reset code to determine whether or not to reset itself.

A transaction controller 330 performs data transfer transaction layer processing. In more detail, the transaction controller 330 controls transfer of packets such as a request packet, a stream packet, a response packet, and an acknowledge packet, and controls a transaction made up of a plurality of packets. The transaction controller 330 controls each circuit block of the link controller 100.

An elastic buffer 111 included in the interface circuit 110 is a buffer which functions as a FIFO buffer for data (RGB data) input from the link controller 100. A signal generator 112 included in the interface circuit 110 generates an interface signal (e.g. RGB interface signal) based on data (RGB data) from the link controller 100, interface information (timing information), and the like. The generated interface signal is output to the display driver 6 through the interface bus.

When the target-side internal circuit in the subsequent stage has malfunctioned due to noise imposed on the serial transmission line, the malfunction continuously occurs unless the malfunction is corrected. In particular, in stream transfer using the stream packet as shown in FIG. 10B, the target in the subsequent stage cannot notify the host in the preceding stage of occurrence of the malfunction. In stream transfer, the target does not transmit an acknowledge packet to the host, and the host continuously transmits stream packets to the target. Therefore, the target in the subsequent stage must deliberately and periodically check occurrence of a malfunction due to noise imposed on the serial transmission line.

However, a problem such as an increase in the circuit scale and complication of the processing occurs when deliberately checking occurrence of a malfunction.

According to one embodiment of the invention, the target in the subsequent stage need not check occurrence of a malfunction, since the interface circuit 110 is automatically and periodically reset by the reset signal RST from the reset signal output circuit 312. Specifically, the interface circuit 110 is reset each time the target receives the synchronization signal code (vertical synchronization signal code) which directs generation of the synchronization signal. Therefore, according to one embodiment of the invention, a problem in which a malfunction which has occurred due to noise imposed on the serial transmission line continuously occurs can be prevented while minimizing an increase in the circuit scale and complication of the processing. Therefore, even if an instantaneous malfunction of the display panel such as a change in the display position has occurred due to noise imposed on the serial transmission line, the normal display operation can be autonomously recovered after the instantaneous malfunction.

5. First Modification

Figure 11:
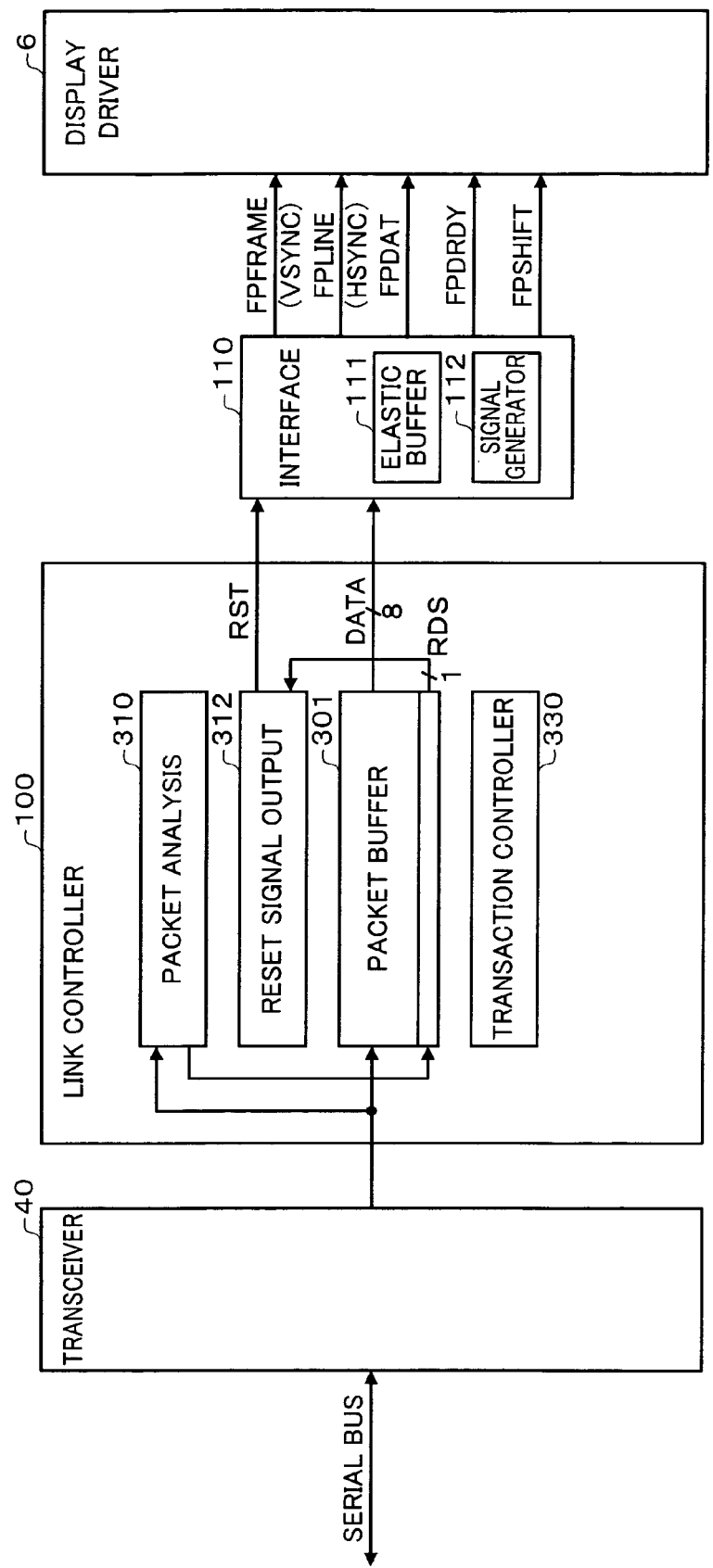
FIG. 11 shows a first modification according to one embodiment of the invention.

FIG. 11 shows a first modification according to one embodiment of the invention. The first modification differs from the configuration shown in FIG. 9 as to the configuration of the packet buffer 301.

The packet buffer 301 shown in FIG. 11 outputs an 8-bit (N-bit in a broad sense; N is an integer or an integer expressed by a power of two) signal (data signal) and a 1-bit signal. Specifically, while the packet buffer 301 shown in FIG. 9 outputs only the 8-bit (N-bit) signal (data signal), the packet buffer 301 shown in FIG. 11 further outputs a 1-bit signal in addition to the 8-bit signal. In other words, while the packet buffer 301 shown in FIG. 9 has an 8-bit (N-bit) configuration, the packet buffer 301 shown in FIG. 11 has a 9-bit ((N+1)-bit) configuration.

When the packet analysis circuit 310 has determined that the received packet includes the synchronization signal code (synchronization signal generation direction information) which directs generation of the synchronization signal, the packet buffer 301 shown in FIG. 11 outputs a reset direction signal RDS as the 1-bit signal. When the reset direction signal RDS has been output from the packet buffer 301, the reset signal output circuit 312 outputs the reset signal RST to the interface circuit 110. Specifically, the reset signal output circuit 312 outputs the signal RDS to the interface circuit 110 as the reset signal RST. In this case, the reset signal output circuit 312 is formed by a buffer circuit which buffers the signal RDS and outputs the signal RDS as the reset signal RST.

The signal RDS may be set by the packet analysis circuit 310, for example. Specifically, the packet analysis circuit 310 analyzes the received packet, and sets the signal RDS in the ninth bit of the packet buffer 301 when the packet analysis circuit 310 has detected the synchronization signal code (VS=1). In more detail, the packet analysis circuit 310 sets "RDS=1", for example. This enables the reset signal RST indicated by C1 in FIG. 5 to be output to the interface circuit 110.

According to the first modification shown in FIG. 11, the reset signal RST can be output to the interface circuit 110 merely by increasing the number of bits of the packet buffer 301. Therefore, according to the first modification, a problem in which a malfunction which has occurred due to noise imposed on the serial transmission line continuously occurs can be prevented while minimizing an increase in the circuit scale and complication of the processing.

The packet buffer 301 may have an 8-bit (N-bit) output configuration, and an 8-bit reset code may be output to the interface circuit 110 as the reset signal RST, differing from the first modification shown in FIG. 11.

6. Second Modification

Figure 12:
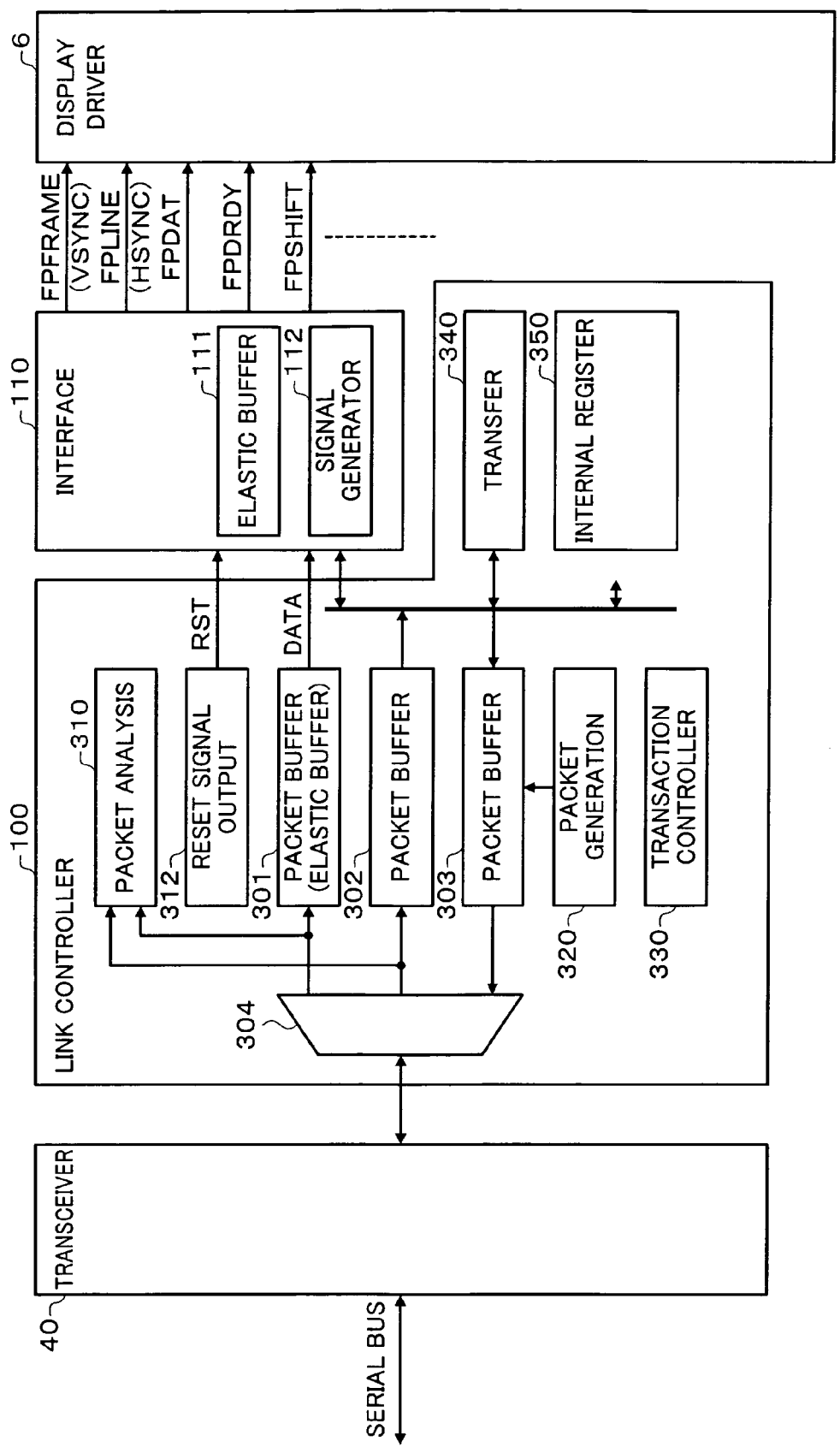
FIG. 12 shows a second modification according to one embodiment of the invention.

FIG. 12 shows a second modification according to one embodiment of the invention. In the second modification, packet buffers 302 and 303, a packet generation circuit 320, a transfer circuit 340, and the internal register 350 are provided in addition to the configuration shown in FIG. 9. The packet buffers 302 and 303, the transfer circuit 340, and the internal register 350 may be provided either inside or outside the link controller 100.

In FIG. 12, the packet buffer 301 is used as an RGB interface (RGB data) reception packet buffer. The packet buffer 302 is used as an MPU interface or serial interface reception packet buffer, for example. The packet buffer 303 is used as an MPU interface or serial interface transmission packet buffer, for example.

The information (RGB data and header) of the RGB interface signal included in the information of the packet received from the transceiver 40 through the multiplexer 304 (demultiplexer) is input to the packet buffer 301 (RGB elastic buffer) which functions as a FIFO buffer, and transferred to the interface circuit 110 (RGB interface circuit). The information of the MPU interface signal or the serial interface signal received from the transceiver 40 through the multiplexer 304 is input to the packet buffer 302, and transferred to the interface circuit 110 (MPU interface circuit or serial interface circuit) and the internal register 350. The information of the packet received from the interface circuit 110 or the internal register 350 is input to the packet buffer 303, and transferred to the transceiver 40 through the multiplexer 304.

The packet generation circuit 320 generates a packet (header) transmitted through the serial bus. In more detail, the packet generation circuit 320 generates a header of a packet to be transmitted, and assembles the packet by combining the header and data. The generated packet is written into the transmission packet buffer 303, and transferred to the transceiver 40 through the multiplexer 304.

The transfer circuit 340 controls transfer of information in the link controller 100. In more detail, the transfer circuit 340 transfers information written into the packet buffer 302 to the interface circuit 110 or the internal register 350. The transfer circuit 340 also transfers information from the interface circuit 110 or the internal register 350 to the packet buffer 303.

The internal register 350 includes various control registers and status registers. The internal register 350 stores interface information for specifying the signal type (output format) of the interface signal output from the interface circuit 110 or the like. In more detail, the internal register 350 stores timing information for specifying the change timing of the signal level of the interface signal.

In the second modification, the timing information is written into the internal register 350 before transferring data. Specifically, the host transmits a packet including the timing information, and the transceiver 40 receives the transmitted packet. The received packet is written into the packet buffer 302 through the multiplexer 304. The timing information included in the packet written into the packet buffer 302 is transferred to the internal register 350 by the transfer circuit 304, and written into the internal register 350. The interface circuit 110 automatically generates the interface signal based on the timing information written into the internal register 350. This makes it unnecessary for the host-side data transfer control device 10 to sample the interface signals from the host device 5 in synchronization with the high-frequency sampling clock signal, whereby power consumption can be reduced. Moreover, an interface signal of which the signal level changes at an appropriate timing can be generated without successively transferring detailed information on the interface signal from the host to the target. Therefore, the amount of data transferred through the serial bus can be reduced, whereby an efficient data transfer can be realized.

7. Detailed Configuration Example of Interface Circuit

Figure 13:
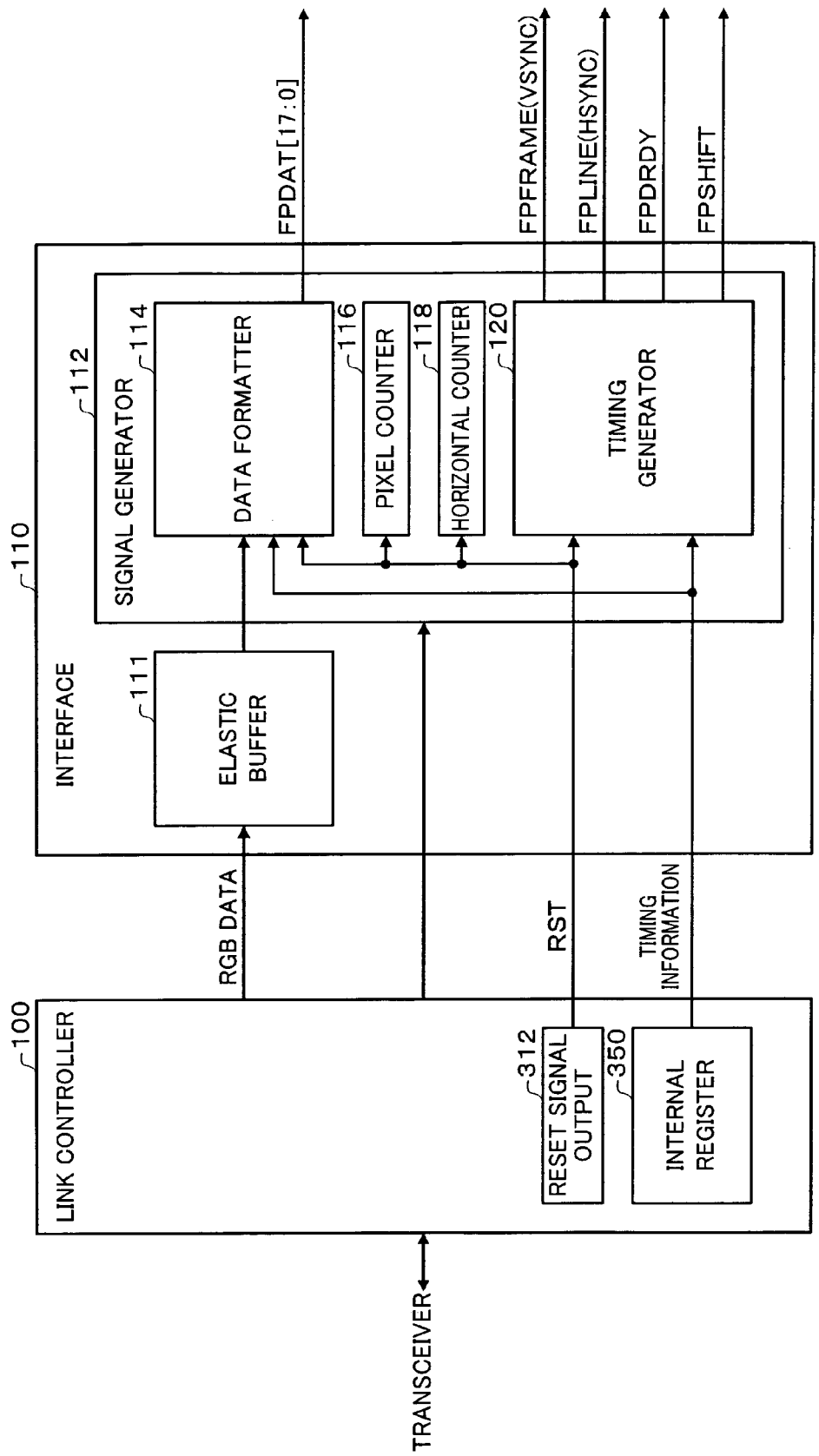
FIG. 13 is a detailed configuration example of an interface circuit.

FIG. 13 shows a detailed configuration example of the interface circuit 110. The RGB interface signal information (RGB data and header) output from the link controller 100 is input to the interface circuit 110. The RGB data is temporarily stored in the elastic buffer 111 which functions as a FIFO buffer. The RGB interface signals such as the vertical synchronization signal, horizontal synchronization signal, ready signal, clock signal, and data signal are generated by the signal generator 112, and output to the display driver 6 as the signals FPFRAME, FPLINE, FPDRDY, FPSHIFT, and FPDAT[17:0].

As shown in FIG. 13, the signal generator 112 includes a data formatter 114, a pixel counter 116, a horizontal counter 118, and a timing generator 120. Note that some of these sections may be omitted from the signal generator 112.

The data formatter 114 (timing generator) receives the RGB data information from the link controller 100 through the elastic buffer 111, and receives the timing information (e.g. HDPS and HDP) from the internal register 350. The data formatter 114 generates and outputs the data signal FPDAT [17:0] which synchronizes with the pixel clock signal FPSHIFT, as shown in FIG. 6B, based on the count value from the pixel counter 116. The pixel counter 116 is a counter which counts the pixel clock signal for sampling each RGB pixel data. The horizontal counter 118 (line counter or H counter) is a counter which counts the horizontal synchronization signal.

The timing generator 120 receives header information including the synchronization signal code from the link controller 100, and receives the timing information (e.g. VT, VPW, VDPS, VDP, HT, and HPW) from the internal register 350. The timing generator 120 generates and outputs the vertical synchronization signal FPFRAME and the horizontal synchronization signal FPLINE at the timings as shown in FIGS. 6A and 6B based on the count value from the pixel counter 116 and the count value from the horizontal counter 118. Specifically, the timing generator 120 performs decode processing based on the count value and the timing information to generate the signals FPFRAME, FPLINE, and the like.

In one embodiment of the invention, as shown in FIG. 13, the pixel counter 116 and the horizontal counter 118 for generating the synchronization signals FPFRAME and FPLINE are reset by the reset signal RST from the reset signal output circuit 312. The data formatter 114 and the timing generator 120 are also reset by the reset signal RST. Note that only the pixel counter 116 and the horizontal counter 118 may be reset by the reset signal RST.

The pixel counter 116 and the horizontal counter 118 are reset in the cycle of the vertical synchronization signal or the cycle of the horizontal synchronization signal. Therefore, a problem does not occur even if the counter is reset when the synchronization signal code (vertical synchronization signal code) has been detected.

Even if a malfunction has occurred due to noise imposed on the serial transmission line, a problem in which the malfunction continuously occurs can be prevented by resetting the pixel counter 116 and the horizontal counter 118 when the synchronization signal code has been detected. Therefore, even if an instantaneous malfunction of the display panel such as a change in the display position has occurred due to noise imposed on the serial transmission line, the normal display operation can be autonomously recovered after the instantaneous malfunction.

8. Data Transfer Method Using Differential Signals

Figure 14:
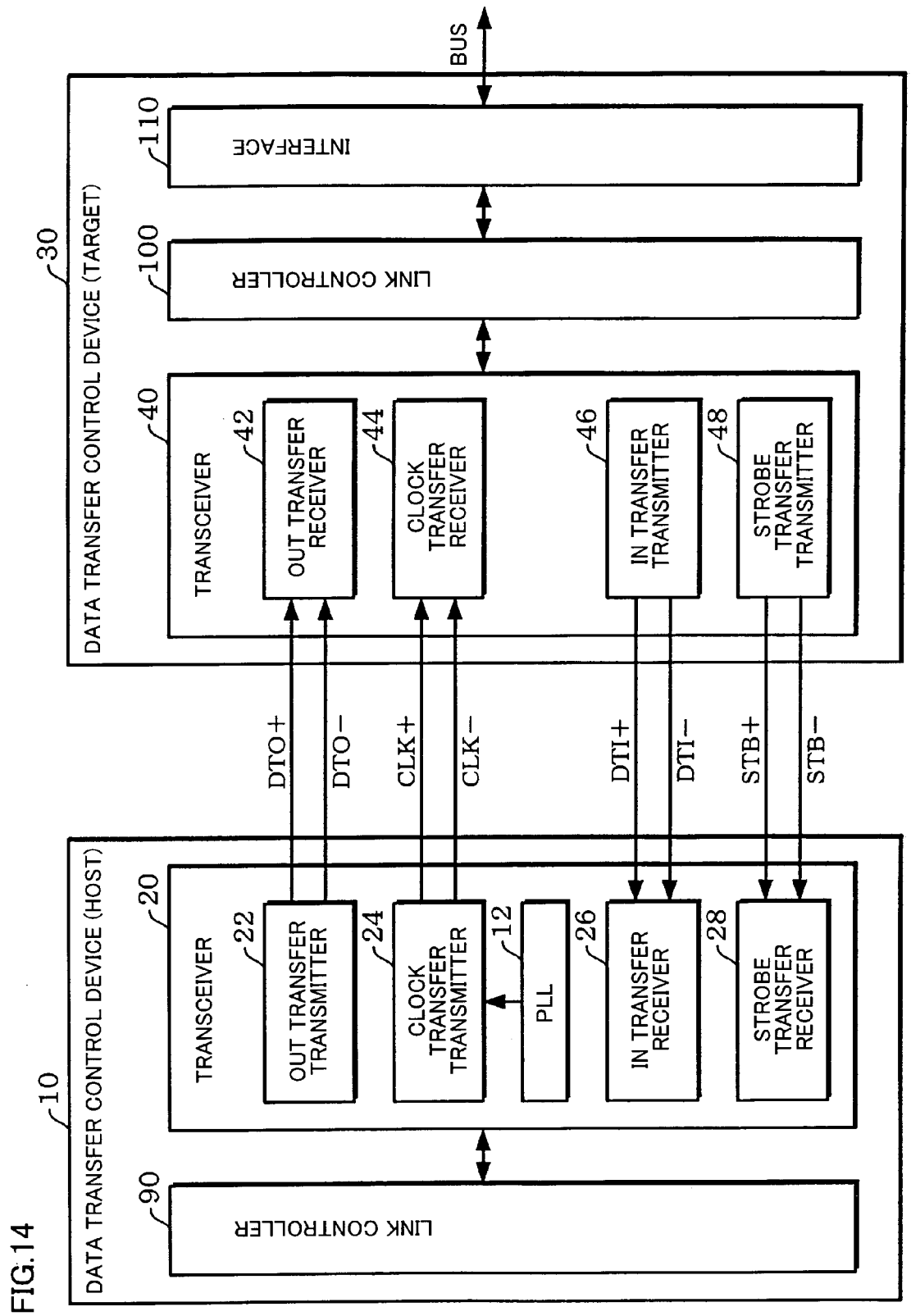
FIG. 14 is illustrative of serial transfer according to one embodiment of the invention.

The serial transfer method according to one embodiment of the invention is described below with reference to FIG. 14. In FIG. 14, DTO+ and DTO− indicate data (OUT data) output from the host (data transfer control device 10) to the target (data transfer control device 30). CLK+ and CLK− indicate clock signals supplied from the host to the target. The host outputs the data DTO+/− in synchronization with the edge (e.g. rising edge; may be falling edge) of the clock signals CLK+/−. Therefore, the target can sample and store the data DTO+/− using the clock signals CLK+/−. In FIG. 14, the target operates based on the clock signals CLK+/− supplied from the host. Specifically, the clock signals CLK+/− serve as a system clock signal of the target. Therefore, a phase locked loop (PLL) circuit 12 (clock signal generation circuit in a broad sense) is provided to the host, and is not provided to the target.

DTI+ and DTI− indicate data (IN data) output from the target to the host. STB+ and STB− indicate strobes (clock signals in a broad sense) supplied from the target to the host. The target generates and outputs the strobes STB+/− based on the clock signals CLK+/− supplied from the host. The host outputs the data DTI+/− in synchronization with the edge (e.g. rising edge; may be falling edge) of the strobes STB+/−. Therefore, the host can sample and store the data signals DTI+/− using the strobes STB+/−.

The data DTO+/−, the clock signals CLK+/−, the data DTI+/−, and the strobes STB+/− are transmitted by causing a transmitter circuit (driver circuit) to current-drive (voltage-drive) the corresponding differential signal lines. In order to realize a higher speed transfer, two or more pairs of DTO+/− differential signal lines and DTI+/− differential signal lines may be provided.

The host-side transceiver 20 includes OUT transfer (data transfer in a broad sense) and clock transfer transmitter circuits 22 and 24, and IN transfer (data transfer in a broad sense) and strobe transfer (clock transfer in a broad sense) receiver circuits 26 and 28. The target-side transceiver 40 includes OUT transfer and clock transfer receiver circuits 42 and 44, and IN transfer and strobe transfer transmitter circuits 46 and 48. Note that some of these circuit blocks may be omitted.

The OUT transfer and clock transfer transmitter circuits 22 and 24 respectively transmit the data DTO+/− and the clock signals CLK+/− by current-driving the DTO+/− differential signal lines and the CLK+/− differential signal lines. The OUT transfer and clock transfer receiver circuits 42 and 44 respectively receive the data DTO+/− and the clock signals CLK+/− by performing a current/voltage conversion based on current which flows through the DTO+/− differential signal lines and the CLK+/− differential signal lines, and performing comparison processing (differential amplification processing) between differential voltage signals (first and second voltage signals) obtained by the current/voltage conversion.

The IN transfer and clock transfer transmitter circuits 46 and 48 respectively transmit the data DTI+/− and the strobes STB+/− by current-driving the DTI+/− differential signal lines and the STB+/− differential signal lines. The IN transfer and strobe transfer receiver circuits 26 and 28 respectively receive the data DTI+/− and the strobes STB+/− by performing a current/voltage conversion based on current which flows through the DTI+/− differential signal lines and the STB+/− differential signal lines, and comparing (differential amplification processing) the differential voltage signals (first and second voltage signals) obtained by the current/voltage conversion.

9. Electronic Instrument

Figure 15:
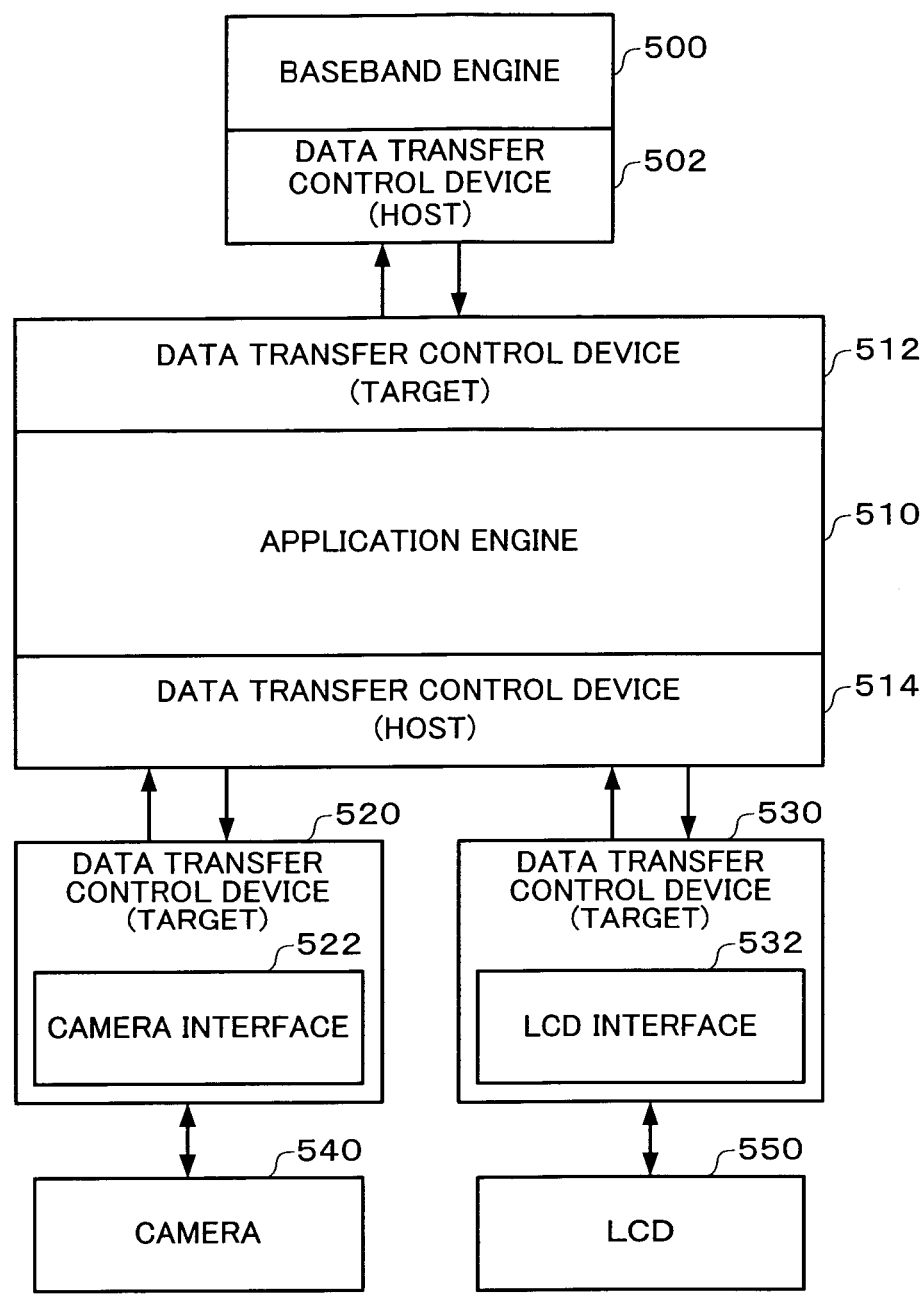
FIG. 15 is a configuration example of an electronic instrument.

FIG. 15 shows a configuration example of an electronic instrument according to one embodiment of the invention. The electronic instrument includes data transfer control devices 502, 512, 514, 520, and 530 described in one embodiment of the invention. The electronic instrument also includes a baseband engine 500 (communication device in a broad sense), an application engine 510 (processor in a broad sense), a camera 540 (imaging device in a broad sense), and an LCD 550 (display device in a broad sense). The electronic instrument may have a configuration in which some of these sections are omitted. According to this configuration, a portable telephone or the like having a camera function and a liquid crystal display (LCD) display function can be realized. Note that the electronic instrument according to one embodiment of the invention is not limited to a portable telephone, and may be applied to various electronic instruments such as a digital camera, PDA, electronic notebook, electronic dictionary, or portable information terminal.

As shown in FIG. 15, the serial transfer described in one embodiment of the invention is performed between the host-side data transfer control device 502 provided in the baseband engine 500 and the target-side data transfer control device 512 provided in the application engine 510 (graphic engine). The serial transfer described in one embodiment of the invention is also performed between the host-side data transfer control device 514 provided in the application engine 510 and the data transfer control device 520 including a camera interface circuit 522 or the data transfer control device 530 including an LCD interface circuit 532. The baseband engine 500 and the application engine 510 may be implemented by a single hardware device (e.g. CPU).

According to the configuration shown in FIG. 15, EMI noise can be reduced in comparison with a known electronic instrument. Moreover, power consumption of the electronic instrument can be further reduced by realizing a reduction in scale and power consumption of the data transfer control device. In the case where the electronic instrument is a portable telephone, a serial signal line can be used as a signal line passing through the connection section (hinge section) of the portable telephone, whereby mounting can be facilitated.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention. Any term (such as a display driver and synchronization signal code) cited with a different term having broader or the same meaning (such as a device and synchronization signal generation direction information) at least once in this specification and drawings can be replaced by the different term in any place in this specification and drawings.

The configurations and the operations of the data transfer control device and the electronic instrument are not limited to the configurations and the operations described in one embodiment of the invention. Various modifications and variations may be made. For example, the form or detection method of the synchronization signal generation direction information and the reset signal output method are not limited to those described in one embodiment of the invention.

What is claimed is:

1. A data transfer control device that controls data transfer, the data transfer control device comprising:

a controller that analyzes a packet received through a serial bus;

an interface circuit that generates interface signals and outputs the interface signals to an interface bus, the interface signals including a vertical synchronization signal, a horizontal synchronization signal and a data signal; and a reset signal output circuit that outputs a reset signal of the interface circuit to the interface circuit;

the interface circuit including:

a horizontal counter that counts a horizontal synchronization cycle;

a pixel counter that counts a pixel clock cycle; and a timing generator that outputs the vertical synchronization signal, the horizontal synchronization signal and the data signal based on a first count value from the horizontal counter and a second count value from the pixel counter, the controller analyzing a packet received through the serial bus to determine whether or not the received packet includes synchronization signal generation direction information that directs the interface circuit to generate the vertical synchronization signal and the horizontal synchronization signal, the reset signal output circuit outputting the reset signal to the interface circuit when the controller has determined that the received packet includes the synchronization signal generation direction information that directs the interface circuit to generate the vertical synchronization signal, and the horizontal counter and the pixel counter being reset by the reset signals in a vertical synchronization cycle to prevent occurrence of a malfunction due to noise imposed on the serial bus.

2. The data transfer control device as defined in claim 1, a packet received through the serial bus including a synchronization signal code field that sets a synchronization signal code that is the synchronization signal generation direction information, the controller analyzing the synchronization signal code field of a packet received through the serial bus to determine whether or not the synchronization signal code that directs the interface circuit to generate the vertical synchronization signal and the horizontal synchronization signal is set in the synchronization signal code field; and the reset signal output circuit outputting the reset signal to the interface circuit when the controller has determined that the synchronization signal code that directs the interface circuit to generate the vertical synchronization signal is set in the synchronization signal code field of the received packet.

3. The data transfer control device as defined in claim 2, the controller receiving a display period packet, in which data is set in a data field, through the serial bus in a display period, and receiving a non-display period packet, in which data is not set in the data field, through the serial bus in a non-display period.

4. The data transfer control device as defined in claim 3, when the controller has received the display period packet in which data is set in the data field, the controller outputting the header including the synchronization signal code set in the packet and the data set in the packet to the interface circuit, and, when the controller has received the non-display period packet in which data is not set in the data field, the controller outputting the header including the synchronization signal code set in the packet to the interface circuit.

5. The data transfer control device as defined in claim 1, comprising:

an internal register in which timing information that specifies change timing of signal levels of the interface signals output from the interface circuit is set, the interface circuit generating the interface signals of which the signal levels changes at timings according to the timing information based on the timing information set in the internal register.

6. The data transfer control device as defined in claim 5, the timing information being set in the internal register based on a timing information packet received through the serial bus.

7. The data transfer control device as defined in claim 6, the controller receiving a packet in which data is set in the data field through the serial bus after the timing information has been set in the internal register, and the interface circuit outputting the data signal of which data is set in the packet, the vertical synchronization signal and the horizontal synchronization signal at timings according to the timing information set in the internal register.

8. The data transfer control device as defined in claim 1, comprising:

a packet buffer into which a packet received through the serial bus is written and that outputs an N-bit signal and a 1-bit signal, the packet buffer outputting a reset direction signal as the 1-bit signal when the controller has determined that the received packet includes the synchronization signal generation direction information, and the reset signal output circuit outputting the reset signal to the interface circuit when the reset direction signal has been output from the packet buffer.

9. The data transfer control device as defined in claim 2, comprising:

a packet buffer into which a packet received through the serial bus is written and that outputs an N-bit signal and a 1-bit signal, the packet buffer outputting a reset direction signal as the 1-bit signal when the controller has determined that the received packet includes the synchronization signal generation direction information, and the reset signal output circuit outputting the reset signal to the interface circuit when the reset direction signal has been output from the packet buffer.

10. The data transfer control device as defined in claim 5, comprising:

a packet buffer into which a packet received through the serial bus is written and that outputs an N-bit signal and a 1-bit signal, the packet buffer outputting a reset direction signal as the 1-bit signal when the controller has determined that the received packet includes the synchronization signal generation direction information, and the reset signal output circuit outputting the reset signal to the interface circuit when the reset direction signal has been output from the packet buffer.

11. The data transfer control device as defined in claim 1, the interface circuit outputting an RGB interface signal.

12. The data transfer control device as defined in claim 1, comprising a transceiver that transmits and receives a packet to and from a host-side data transfer control device using differential signal lines of the serial bus.

13. An electronic instrument comprising:

the data transfer control device as defined in claim 1; and a device connected with the data transfer control device through the interface bus.

14. An electronic instrument comprising:

the data transfer control device as defined in claim 2; and a device connected with the data transfer control device through the interface bus.

15. An electronic instrument comprising:

the data transfer control device as defined in claim 5; and a device connected with the data transfer control device through the interface bus.

16. An electronic instrument comprising:
the data transfer control device as defined in claim 8; and
a device connected with the data transfer control device through the interface bus.

17. The data transfer control device as defined in claim 1, comprising:
an internal register in which timing information that specifies change timings of signal levels of the vertical synchronization signal, the horizontal synchronization signal and the data signal output from the interface circuit are set,
the interface circuit adjusting actual change timings of the vertical synchronization signal, the horizontal synchronization signal and the data signal based on the timing information set in the internal register, the first count value from the horizontal counter and the second count value from the pixel counter when the packet including the synchronization signal generation direction information is received.

18. The data transfer control device as defined in claim 17, the interface circuit performing decode processing based on the first count value from the horizontal counter and the second count value from the pixel counter to generate the vertical synchronization signal, the horizontal synchronization signal and the data signal.

19. The data transfer control device as defined in claim 17, the timing information being set in the internal register based on a timing information packet received through the serial bus from a host-side data transfer device.

20. The data transfer control device as defined in claim 17,
the synchronization signal generation direction information being received through the serial bus from a host-side data transfer device,
the host-side data transfer device receiving a host-side vertical synchronization signal, a host-side horizontal synchronization signal and a host-side data signal from a host,
the host-side data transfer device setting the synchronization signal generation direction information indicating direction of generating the vertical synchronization signal when the host-side vertical synchronization from the host is detected,
the host-side data transfer device setting the synchronization signal generation direction information indicating direction of generating the horizontal synchronization signal when the host-side horizontal synchronization from the host is detected, and
the interface circuit generating the vertical synchronization signal, the horizontal synchronization signal and the data signal as the reproduction signals of the host-side vertical synchronization signal, the host-side horizontal synchronization signal and the host-side data signal based on the timing information.

* * * * *